(12) United States Patent
Taka et al.

(10) Patent No.: US 10,620,757 B2
(45) Date of Patent: Apr. 14, 2020

(54) INPUT DEVICE AND ELECTRICAL APPARATUS

(71) Applicant: Sony Corporation, Tokyo (JP)

(72) Inventors: Yoshiteru Taka, Kanagawa (JP); Takeshi Koizumi, Miyagi (JP); Tomoki Kawabata, Kanagawa (JP); Munetake Ebihara, Tokyo (JP); Tatsuya Nakazawa, Miyagi (JP); Machiko Endo, Miyagi (JP); Takuya Goto, Miyagi (JP); Keiichi Nakamura, Ibaraki (JP); Yukio Sakakibara, Chiba (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 15/554,854

(22) PCT Filed: Jan. 26, 2016

(86) PCT No.: PCT/JP2016/000377
§ 371 (c)(1),
(2) Date: Aug. 31, 2017

(87) PCT Pub. No.: WO2016/143241
PCT Pub. Date: Sep. 15, 2016

(65) Prior Publication Data
US 2018/0039353 A1    Feb. 8, 2018

(30) Foreign Application Priority Data

Mar. 9, 2015 (JP) .................................. 2015-046526
May 11, 2015 (JP) .................................. 2015-096826

(51) Int. Cl.
*G06F 3/044* (2006.01)
*G06F 1/16* (2006.01)

(52) U.S. Cl.
CPC .............. *G06F 3/044* (2013.01); *G06F 1/169* (2013.01); *G06F 1/1671* (2013.01)

(58) Field of Classification Search
CPC ........ G06F 3/044; G06F 1/169; G06F 1/1671; G06F 3/02; G06F 3/0362
See application file for complete search history.

(56) References Cited

U.S. PATENT DOCUMENTS 8,857,276 B2 * 10/2014 Suzuki ....................... G01L 1/20
 73/862.68
2004/0181312 A1 * 9/2004 Miura ..................... B25J 13/085
 700/258

(Continued)

FOREIGN PATENT DOCUMENTS

JP    2005-339298 A  * 12/2005
JP    2005-339298 A    12/2005

(Continued)

OTHER PUBLICATIONS

International Search Report and Written Opinion and English translation thereof dated Apr. 5, 2016 in connection with International Application No. PCT/JP2016/000377.

(Continued)

*Primary Examiner* — Nitin Patel
*Assistant Examiner* — Amy Onyekaba
(74) *Attorney, Agent, or Firm* — Wolf, Greenfield & Sacks, P.C.

(57) ABSTRACT

An input device includes a casing having a recess in its inner surface, and a pressure-sensitive sensor disposed in the recess. The pressure-sensitive sensor is fixed in the recess so that a sensing surface of the pressure-sensitive sensor and a bottom surface of the recess are in contact with each other.

15 Claims, 26 Drawing Sheets

(56) References Cited

U.S. PATENT DOCUMENTS

| | | | | |
|---|---|---|---|---|
| 2011/0175845 A1* | 7/2011 | Honda | ................. | G06F 3/0414 |
| | | | | 345/174 |
| 2012/0068965 A1* | 3/2012 | Wada | .................... | G06F 3/0414 |
| | | | | 345/174 |
| 2012/0098767 A1* | 4/2012 | Takai | ...................... | G06F 3/041 |
| | | | | 345/173 |
| 2012/0182249 A1* | 7/2012 | Endo | ....................... | G01L 1/205 |
| | | | | 345/173 |
| 2012/0327011 A1* | 12/2012 | Faubert | ................ | G06F 1/1626 |
| | | | | 345/173 |
| 2013/0193532 A1* | 8/2013 | Horie | ...................... | H01L 29/84 |
| | | | | 257/415 |
| 2013/0234264 A1* | 9/2013 | Suganumata | ........... | B81B 7/007 |
| | | | | 257/415 |
| 2014/0036458 A1 | 2/2014 | Sato et al. | | |
| 2015/0035411 A1* | 2/2015 | Kawamura | ............... | G01L 1/16 |
| | | | | 310/330 |
| 2015/0346839 A1 | 12/2015 | Kawaguchi et al. | | |
| 2015/0346891 A1* | 12/2015 | Miller | ................... | G06F 3/0416 |
| | | | | 345/173 |
| 2016/0026297 A1 | 1/2016 | Shinkai et al. | | |
| 2016/0206215 A1* | 7/2016 | Takahashi | ............... | A61B 5/681 |
| 2017/0024049 A1* | 1/2017 | Tachikawa | ............... | G06F 3/044 |
| 2017/0168621 A1* | 6/2017 | Jo | .......................... | G06F 3/0412 |
| 2017/0262113 A1* | 9/2017 | Mori | .......................... | G01L 1/16 |
| 2018/0364123 A1* | 12/2018 | Vaupel | .................. | G01L 19/147 |

FOREIGN PATENT DOCUMENTS

| | | |
|---|---|---|
| JP | 2011-170659 A | 9/2011 |
| JP | 2014-029372 A | 2/2014 |
| JP | 2014-153956 A | 8/2014 |
| JP | 2014-160448 A | 9/2014 |
| JP | 5658838 B1 | 1/2015 |
| JP | 2015-035206 A * | 2/2015 |
| WO | WO 2014/147943 A1 | 9/2014 |

OTHER PUBLICATIONS

International Preliminary Report on Patentability and English translation thereof dated Sep. 21, 2017 in connection with International Application No. PCT/JP2016/000377.

* cited by examiner

A

B

B 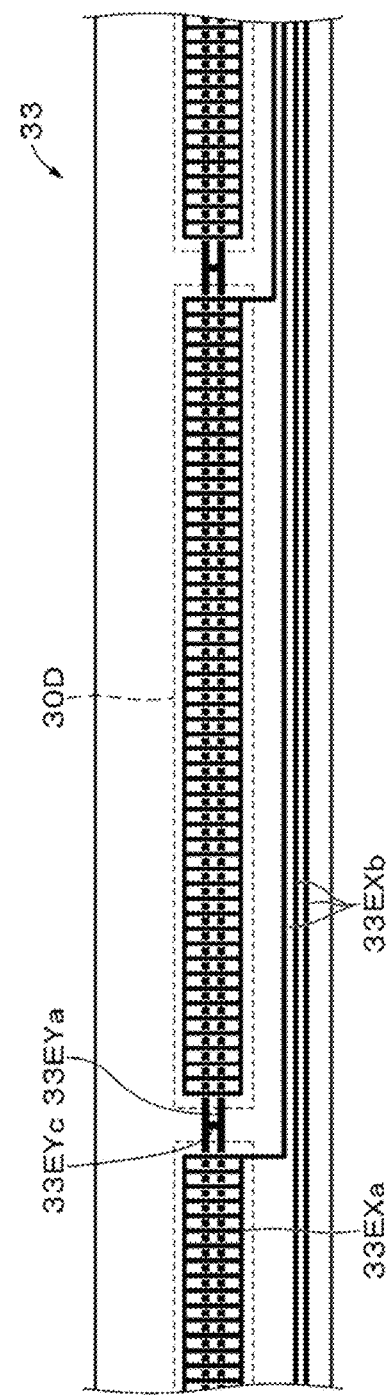

A

B

C

A

B

C

D

A

B

A

B

C

A

B

C

A

B

A

B

A

B

A

B

C

INPUT DEVICE AND ELECTRICAL APPARATUS

This is a U.S. National Stage Application under 35 U.S.C. § 371, based on International Application No. PCT/JP2016/000377, filed Jan. 26, 2016, which claims priority to Japanese Patent Application JP2015-096826, filed May 11, 2015 and Japanese application number JP2015-046526, filed Mar. 9, 2015, each of which is hereby incorporated by reference in its entirety.

TECHNICAL FIELD

The present technology relates to an input device and an electrical apparatus, which include one or more pressure-sensitive sensors.

BACKGROUND ART

In recent years, pressure-sensitive sensors that can electrostatically detect input operations are extensively used in various electrical apparatus such as mobile personal computers (PCs) and tablet PCs. As pressure-sensitive sensors for electrical apparatus, those which include capacitive devices and have a configuration to permit detecting positions pointed by a pointer to an input operation surface and pressing forces are known (for example, see PTL 1).

CITATION LIST

Patent Literature

[PTL 1]
JP 2011-170659 A

SUMMARY

Technical Problem

The present technology has as objects thereof the provision of an input device and an electrical apparatus, which can detect pressing of a surface of a casing or exterior body.

Solution to Problem

To solve the above-described problem, a first technology provides an input device including a casing having a recess in an inner surface thereof, and a pressure-sensitive sensor disposed in the recess. The pressure-sensitive sensor is fixed in the recess so that a sensing surface of the pressure-sensitive sensor and a bottom surface of the recess are in contact with each other.

A second technology provides an input device including a casing having a recess in an inner surface thereof, and a plurality of elongated pressure-sensitive sensors disposed in the recess. The pressure-sensitive sensors are disposed at intervals in longitudinal directions of the pressure-sensitive sensors, and the pressure-sensitive sensors are fixed in the recess so that sensing surfaces of the pressure-sensitive sensors are in contact with a bottom surface of the recess.

A third technology provides an input device including a casing having a plurality of recesses in an inner surface thereof, the recesses being disposed extending in a direction, and a plurality of elongated pressure-sensitive sensors disposed in the recesses individually. The plural number of recesses are disposed in a like plural number of lines, and the pressure-sensitive sensors are fixed in the recesses individually, so that sensing surfaces of the pressure-sensitive sensors are in contact with bottom surfaces of the recesses.

A fourth technology provides an input device including an exterior body having a recess in an inner surface thereof and having rigidity, and a pressure-sensitive sensor disposed in the recess. The pressure-sensitive sensor is fixed in the recess so that a sensing surface of the pressure-sensitive sensor and a bottom surface of the recess are in contact with each other.

A fifth technology provides an electrical apparatus including a casing having a recess in an inner surface thereof, and a pressure-sensitive sensor disposed in the recess. The pressure-sensitive sensor is fixed in the recess so that a sensing surface of the pressure-sensitive sensor and a bottom surface of the recess are in contact with each other.

Advantageous Effect of Invention

According to the present technology, the pressing of the surface of the casing or exterior body can be detected as described above.

BRIEF DESCRIPTION OF DRAWINGS

FIG. 7B is a plan view representing a portion of FIG. 7A on an enlarged scale.

DESCRIPTION OF EMBODIMENTS

Figure 1:
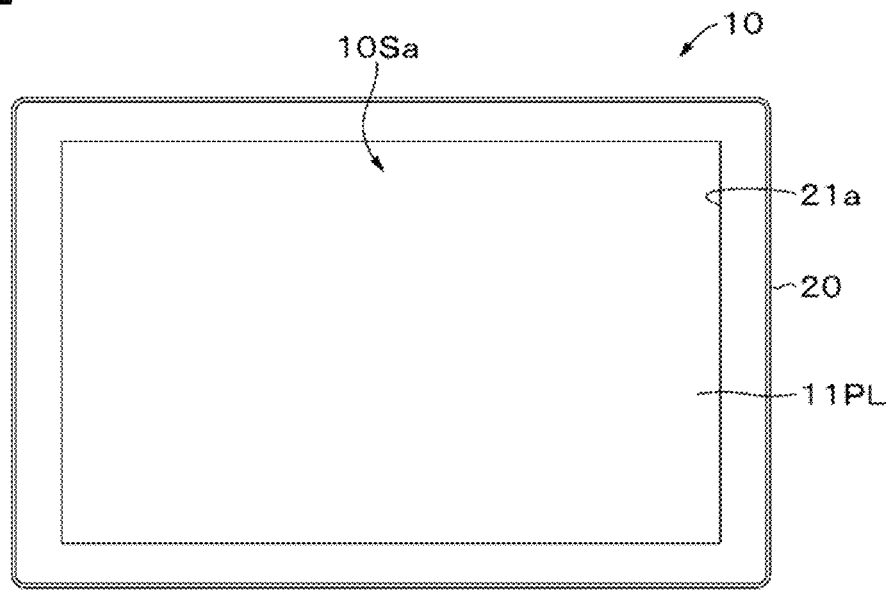
FIG. 1A is a front surface view illustrating one example of an external appearance of an electrical apparatus according to a first embodiment of the present technology.
FIG. 1B is a side surface view illustrating the one example of the external appearance of the electrical apparatus according to the first embodiment of the present technology.
FIG. 1C is a back surface view illustrating the one example of the external appearance of the electrical apparatus according to the first embodiment of the present technology.
Figure 1:
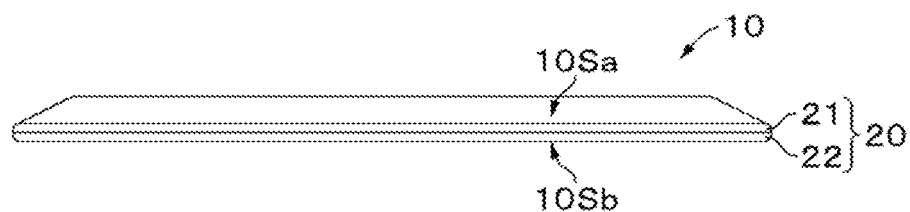
Figure 1:
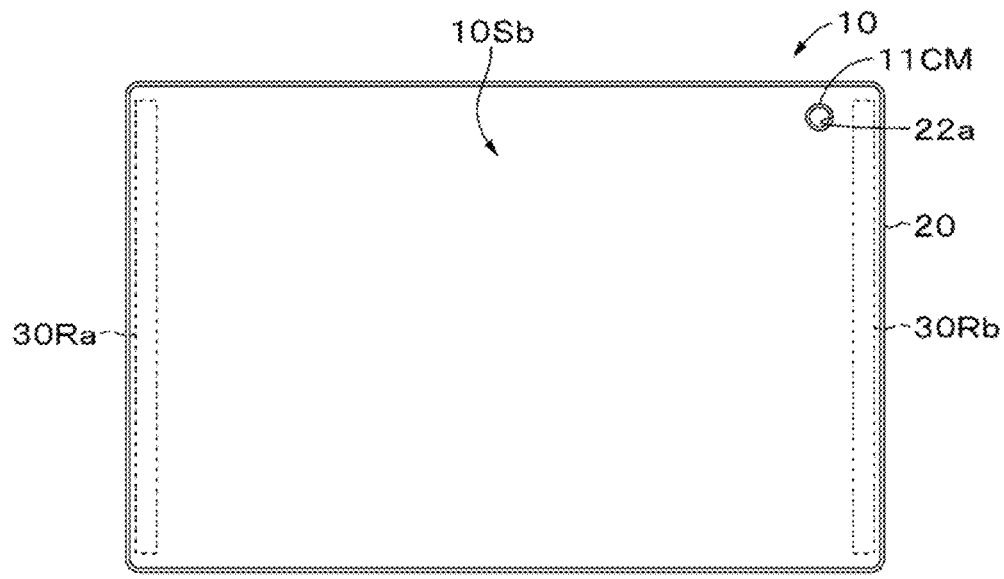

Referring to the drawings, a description will be made about embodiments of the present technology in the following order. It is to be noted that throughout the figures of the following embodiments, the same or corresponding parts will be identified by the same reference symbols.
1. First Embodiment (an example of electrical apparatus)
1.1 External Appearance of Electrical Apparatus
1.2 Configuration of Electrical Apparatus
1.3 Configuration of Sensing Areas
1.4 Configuration of Sensors
1.5 Detection Operation by Sensor
1.6 Operations of Electrical Apparatus
1.7 Effects
1.8 Modifications
2. Second Embodiment (another example of electrical apparatus)
2.1 External Appearance of Electrical Apparatus
2.2 Configuration of Sensing Areas
2.3 Operations of Electrical Apparatus
2.4 Effects
2.5 Modifications
3. Third Embodiment (an example of sensing areas)
3.1 Configuration of Sensing Areas
3.2 Functions of Individual Members of Sensing Areas
3.3 Effects
3.4 Modifications
4. Fourth Embodiment (another example of sensing areas)
4.1 Configuration of Sensing Areas
4.2 Effects
4.3 Modifications
5. Fifth Embodiment (an example of sensors)
5.1 Configuration of Sensors
5.2 Effects
5.3 Modifications
6. Sixth Embodiment (another example of sensors)
6.1 Configuration of Sensors
6.2 Effects
6.3 Modifications
7. Seventh Embodiment (a further example of sensing areas)
7.1 Configuration of Sensing Areas
7.2 Effects
7.3 Modifications

1. First Embodiment 1.1 External Appearance of Electrical Apparatus

As illustrated in FIGS. 1A to 1C, an electrical apparatus 10 according to a first embodiment of the present technology is a so-called tablet computer and includes a casing 20 having rigidity, and a display device 11PL, a camera module 11CM and the like are accommodated in the casing 20. The display device 11PL is disposed on the side of a front surface 10Sa of the electrical apparatus, while the camera module 11CM is disposed on the side of a back surface 10Sb that is located on a side opposite to the front surface 10Sa.

The front surface 10Sa and the back surface 10Sb of the electrical apparatus 10 each have a rectangular shape with long sides and short sides when viewed in a direction perpendicular to these surfaces. Sensing areas 30Ra and 30Rb are disposed at longitudinally opposite end parts individually of the back surface 10Sb of the electrical apparatus 10. The sensing areas 30Ra and 30Rb are disposed along a peripheral edge of the back surface 10Sb, specifically along the short sides of the back surface 10Sb. The sensing areas 30Ra and 30Rb have, for example, an elongated rectangular shape when viewed in the direction perpendicular to the back surface 10Sb. A user can operate the electrical apparatus 10 by pressing the sensing area 30Ra with a pointer such as a finger.

The casing 20 is made of a material having rigidity. As such a material, metal, wood, polymer resin or the like can be mentioned, for example. Illustrative of the metal include simple metals such as aluminum, titanium, zinc, nickel, magnesium, copper, and iron, or alloys containing two or more of these simple metals. Specific examples of the alloys include stainless used steel (SUS), aluminum alloys, magnesium alloys, titanium alloys, and the like.

The casing 20 includes a first casing 21 forming the side of the front surface 10Sa of the electrical apparatus, and a second casing 22 forming the side of the back surface 10Sb of the electrical apparatus. The first casing 21 has a large opening 21a, from which a display section of the display device 11PL is exposed. On the display device 11PL, a touch panel is disposed. The second casing 22 has a small opening 22a in a neighborhood of a corner portion, and a lens portion of the camera module 11CM is exposed from the opening 22a.

Illustrative of the display device 11PL include, but are not limited to, liquid crystal displays, electroluminescence (EL) displays, and the like. Illustrative of the touch panel include, but are not limited to, electrostatic capacitive touch panels.

1.2 Configuration of Electrical Apparatus

Figure 2:
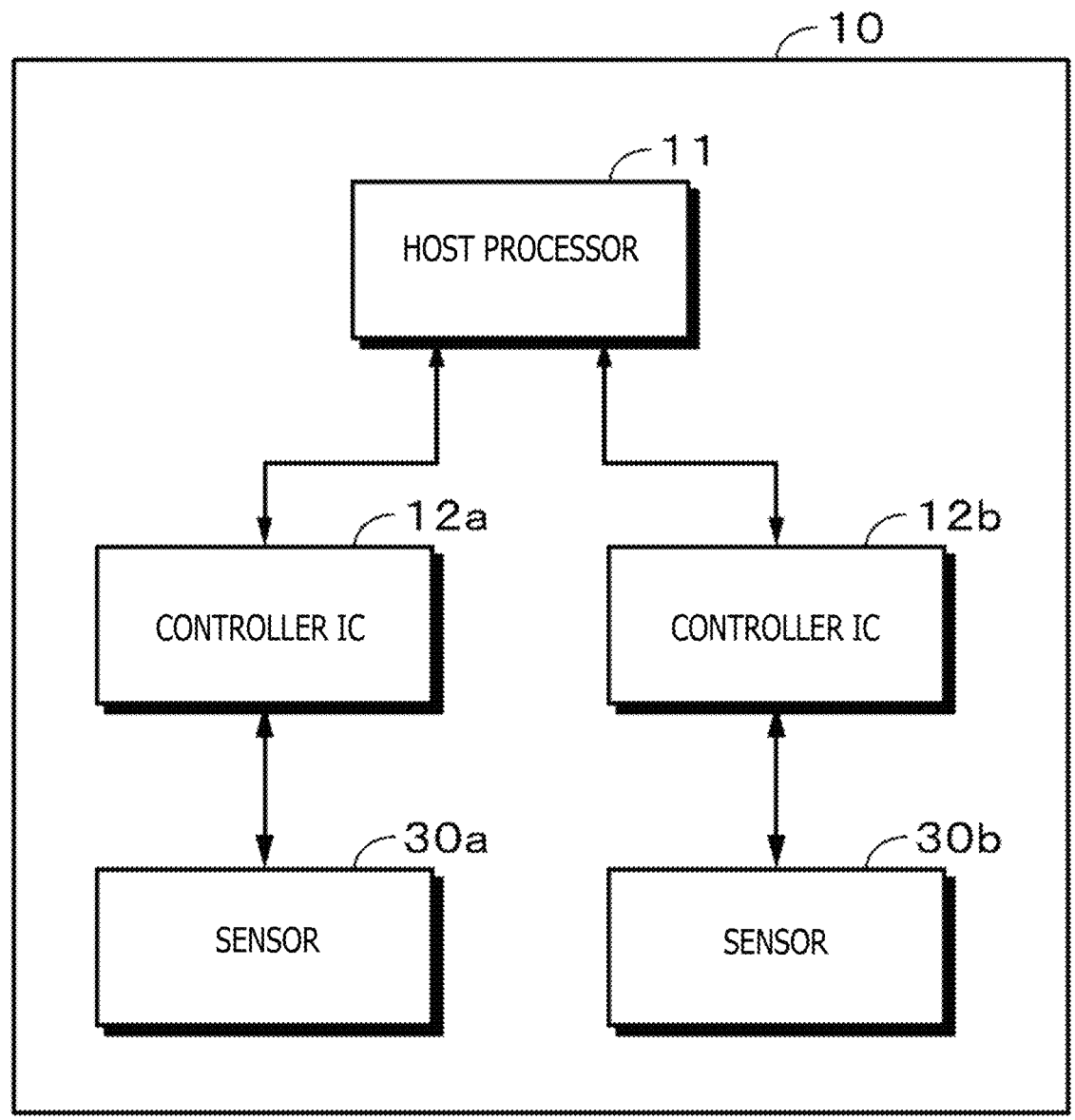
FIG. 2 is a block diagram illustrating one example of a configuration of the electrical apparatus according to the first embodiment of the present technology.

As illustrated in FIG. 2, the electrical apparatus 10 according to the first embodiment of the present technology includes a host processor 11 as a main unit of the electrical apparatus 10, sensors 30a and 30b, and controller integrated circuits (ICs) 12a and 12b.

The sensors 30a and 30b are pressure-sensitive sensors of the electrostatic capacitive type. The controller ICs 12a and 12b detect changes in electrostatic capacitance according to pressing (operations) of the sensing areas 30Ra and 30Rb, and to the host processor 11, output electrostatic capacitance distributions, in other words, sensed pressure distributions corresponding to the changes.

The host processor 11 includes the above-described display device 11PL, camera module 11CM and the like, and performs various processing according to operations of the touch panel disposed over the display device 11PL. For example, the host processor 11 performs processing such as the display of an image or character information on the display device 11PL or the movement of a cursor displayed on the display device 11PL. In addition, the host processor 11 also performs the shooting of a still picture, a movie or the like by the camera module 11CM.

The host processor 11 controls operations of the electrical apparatus on the basis of detection results of the sensors 30a and 30b. Described specifically, the host processor 11 performs predetermined processing on the basis of pressure distributions supplied from the sensors 30a and 30b individually. If a pressure of a predetermined amount or greater is applied to the sensing area 30Ra or 30Rb or if a pressure of a predetermined amount or greater is applied to the sensing area 30Ra or 30Rb for a predetermined time or longer, for example, the host processor 11 cancels the sleep mode (energy saving mode) of the electrical apparatus 10. It is to be noted that the above-described processing at the host processor 11 is performed, specifically by a control unit included in the host processor 11.

1.3 Configuration of Sensing Areas

Figure 3:
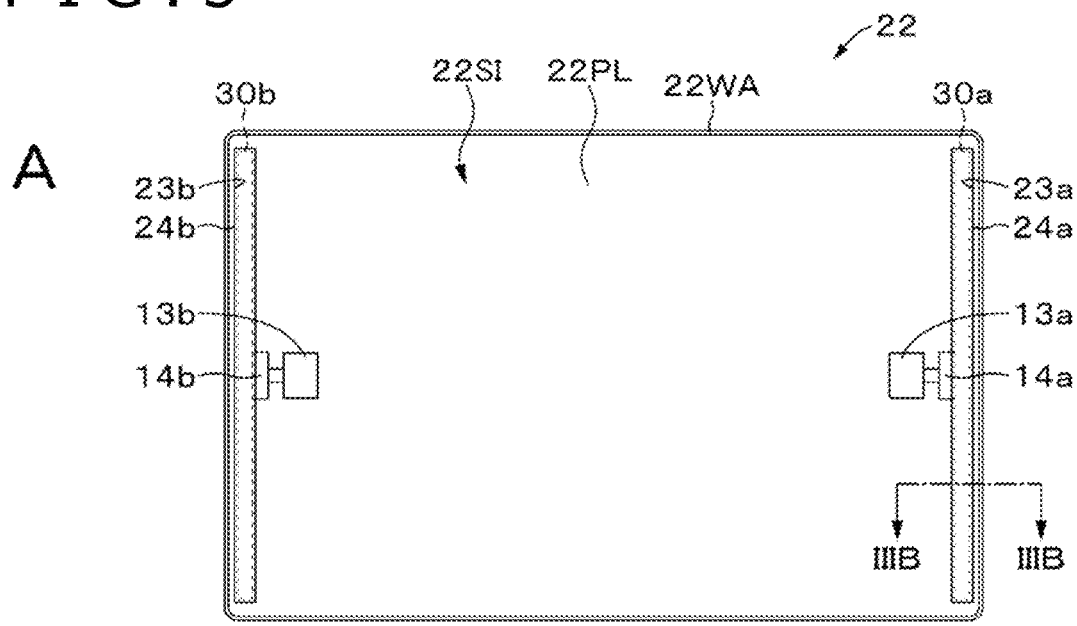
FIG. 3A is a plan view illustrating one example of a configuration of sensing areas.
FIG. 3B is a cross-sectional view taken along line IIIB-IIIB of FIG. 3A.
Figure 3:
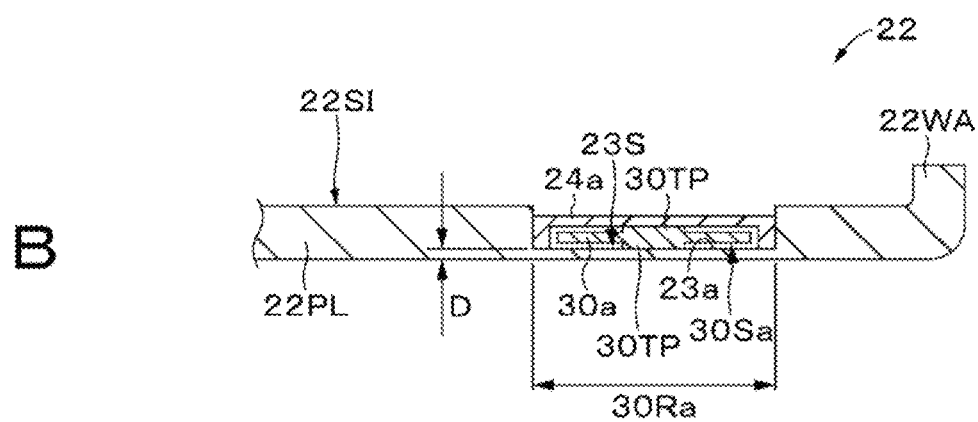

As illustrated in FIGS. 3A and 3B, the second casing 22 which forms the side of the back face 10Sb of the electrical apparatus 10 includes a plate-shaped main surface section 22PL and a peripheral wall 22WA disposed on and along a peripheral edge of the main surface section 22PL. An inner surface 22SI of the second casing 22 has a rectangular shape with long sides and short sides when viewed in a direction perpendicular to the inner surface 22SI.

The second casing 22 includes recesses 23a and 23b at positions on the back side of the sensing areas 30Ra and 30Rb. Described specifically, the recesses 23a and 23b are disposed in longitudinally opposite end parts individually of the inner surface 22SI. The recesses 23a and 23b are disposed extending in a transverse direction of the inner surface 22SI. Described specifically, the recesses 23a and 23b are disposed extending along the short sides of the inner surface 22SI. The recesses 23a and 23b each have a size and shape substantially the same as those of the sensing areas 30Ra and 30Rb. Bottom surfaces 23S of the recesses 23a and 23b have a planar form.

In the recess 23a, the sensor 30a and a back plate 24a as a fixing member are accommodated. Further, the sensor 30a is electrically connected to a printed circuit board assembly (PCBA) 13a via flexible printed circuits (FPC) 14a. The above-described controller IC 12a is mounted on the PCBA 13a. Similarly, the sensor 30b and a back plate 24b as a fixing member are accommodated in the recess 23b. Further, the sensor 30b is electrically connected to a PCBA 13b via FPC 14b. The above-described controller IC 12b is mounted on the PCBA 13b. A further recess may be disposed in the inner surface 22SI of the second casing 22 to accommodate the FPC 14a therein, and this further recess may be integrally joined together with the recess 23a. Similarly, a still further recess may be disposed in the inner surface 22SI of the second casing 22 to accommodate the FPC 14b therein, and this still further recess may be integrally joined together with the recess 23b.

As the recess 23b, the sensor 30b, and the back plate 24b have similar configurations as the recess 23a, the sensor 30a, and the back plate 24a, respectively, a description will hereinafter be made only about the configurations of the recess 23a, the sensor 30a, and the back plate 24a.

Figure 4:
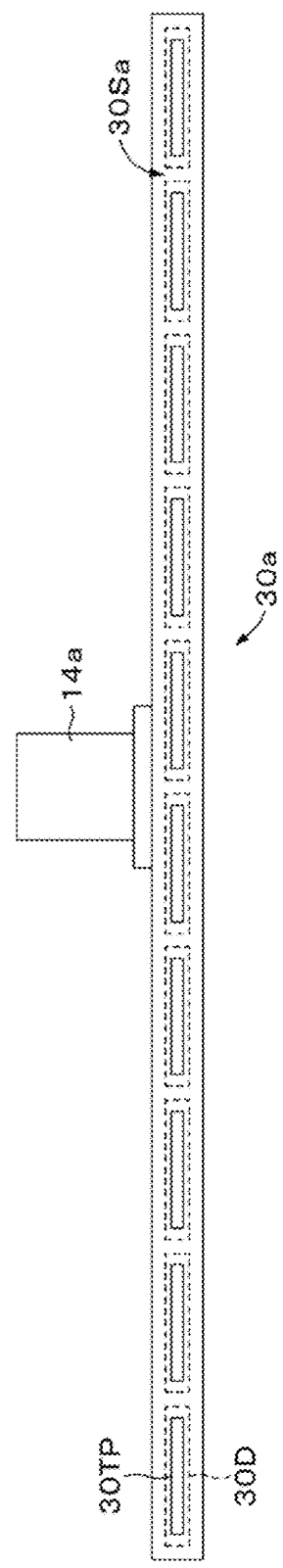
FIG. 4A is a plan view illustrating one example of a sensing surface of a sensor.
FIG. 4B is a side view illustrating one example of a side surface of the sensor.
Figure 4:
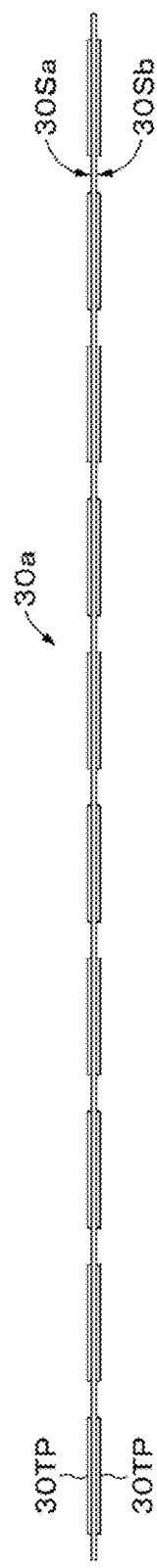

The sensor 30a is a pressure-sensitive sensor that can electrostatically detect pressing (an input operation) of the sensing surface 30Sa. As illustrated in FIGS. 4A and 4B, the sensor 30a is an elongated sheet having a sensing surface 30Sa as a first surface and a back surface 30Sb as a second surface. The sensing surface 30Sa and the back surface 30Sb have a rectangular shape when viewed in a direction perpendicular to the respective surfaces. The sensor 30a may preferably be more readily deformable than the back plate 24a. The sensor 30a may preferably have a Young's modulus Ea smaller than a Young's modulus Eb of the back plate 24a (Ea<Eb), because the sensing area 30Ra can be provided with an improved detection sensitivity.

From the viewpoint of providing the sensing area 30Ra with an improved detection sensitivity, the sensor 30a may have plural raised portions 30TP preferably on at least one of the sensing surface 30Sa and the back surface 30Sb, more preferably on both the sensing surface 30Sa and the back surface 30Sb. If the sensor 30a includes the raised portions 30TP on one of the sensing surface 30Sa and the back surface 30Sb, it is preferred from the viewpoint of providing the sensing area 30Ra with an improved detection sensitivity to dispose the raised portions 30TP on the sensing surface 30Sa that is opposite the bottom surface 23S of the recess 23a. It is to be noted that FIGS. 4A and 4B illustrate the configuration of the sensor 30a having the raised portions 30TP on both the sensing surface 30Sa and the back surface 30Sb.

The sensor 30a includes plural sensor portions 30D, which are linearly disposed at predetermined intervals in the longitudinal direction of the sensor 30a. The raised portions 30TP disposed on the sensing surface 30Sa are disposed at middle positions of the plural sensor portions 30D individually. Further, the raised portions 30TP disposed on the back surface 30Sb are also disposed at middle positions of the plural sensor portions 30D individually.

When the sensor 30a is viewed from a direction perpendicular to the sensing surface 30Sa, each raised portion 30TP has, for example, an elongated shape extending in a longitudinal direction of the sensing surface 30Sa as illustrated in FIG. 4A. However, the shape of each raised portion 30TP shall not be limited to the above-described shape, and can be conical, columnar (e.g., cylindrical or polygonal cylindrical), acicular, partial spherical (e.g., hemispherical), partial ellipsoidal (e.g., hemiellipsoidal), polygonal, or the like.

The sensor 30a is accommodated in the recess 23a so that the sensing surface 30Sa of the sensor 30a and the bottom surface 23S of the recess 23a are opposite each other and are in contact with each other. Therefore, the sensing surface 30Sa serves as a sensing surface that detects pressing against the sensing area 30Ra.

The back plate 24a has a square U-shaped cross-section. The back plate 24a is fitted in the recess 23a of the second casing 22 so that the back plate 24a accommodates the sensor 30a in a recess thereof and covers the back surface 30Sb of the sensor 30a. The back plate 24a fixes the sensor 30a in the recess 23a so that the sensing surface 30Sa of the sensor 30a and the bottom surface 23S of the recess 23a are kept in contact with each other. From the viewpoint of providing the sensing area 30Ra with an improved detection sensitivity, the back plate 24a may preferably be a pressing member that fixes the sensor 30a in the recess 23a in such a way as to press the sensing surface 30Sa of the sensor 30a against the bottom surface 23S of the recess 23a.

The back plate 24a is made, for example, of polymer resin or metal. Spring plates 27a may have a stacked structure of a polymer resin layer and a metal layer. As the polymer resin, those which are similar to the polymer resins of substrates 31a and 35a can be exemplified. It is to be noted that a description will be made subsequently herein about the polymer resins of the substrates 31a and 35a. As the metal, those which are similar to the metal of the casing 20 can be exemplified.

The thickness D of the second casing 22 at the bottom surface 23S of the recess 23a may preferably be small from the viewpoint of providing the sensing area 30Ra with an improved detection sensitivity. The ratio (W/D) of the width W of the recess 23a to the thickness D of the second casing 22 at the bottom surface 23S of the recess 23a may be preferably 20 or greater, more preferably 23 or greater. A ratio (W/D) of 20 or greater makes it possible to provide the sensing area 30Ra with an improved detection sensitivity.

1.4 Configuration of Sensors

Figure 5:
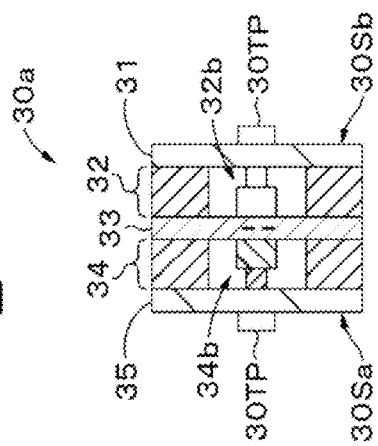
FIG. 5A is a plan view illustrating one example of a configuration of the sensor.
FIG. 5B is a cross-sectional view taken along line VB-VB of FIG. 5A.
FIG. 5C is a cross-sectional view taken along line VC-VC of FIG. 5A.
Figure 5:
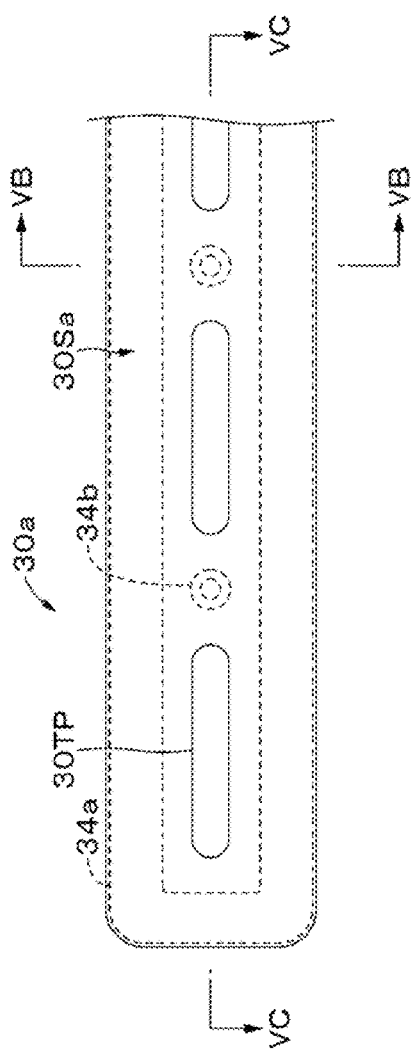
Figure 5:
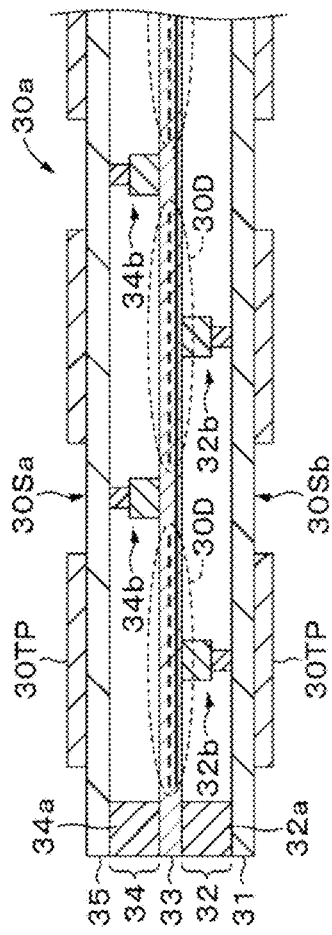

As illustrated in FIGS. 5A to 5C, the sensor 30a includes a reference electrode layer (hereinafter called the "REF electrode layer") 31 as a conductive layer, a space layer 32, a sensor layer 33, another space layer 34, and another REF electrode layer 35 as another conductive layer. In the subsequent description, of opposite main surfaces of each of the sensor 30a and its component elements (component members), the main surface that serves as the side of a sensing surface may be called the front surface, while the main surface on a side opposite to the front surface may be called the back surface.

The REF electrode layer 31 is disposed on the side of the back surface of the sensor layer 33, while the REF electrode layer 35 is disposed on the side of the front surface of the sensor layer 33. By disposing the REF electrode layers 31 and 35 on the sides of both the surfaces of the sensor layer 33 as described above, it is possible to prevent external noises (external electric fields) from penetrating into the sensor 30a. The space layer 32 is disposed between the front surface of the REF electrode layer 31 and the back surface of the sensor layer 33. The space layer 34 is disposed between the front surface of the sensor layer 33 and the back surface of the REF electrode layer 35.

REF Electrode Layer

Figure 6:
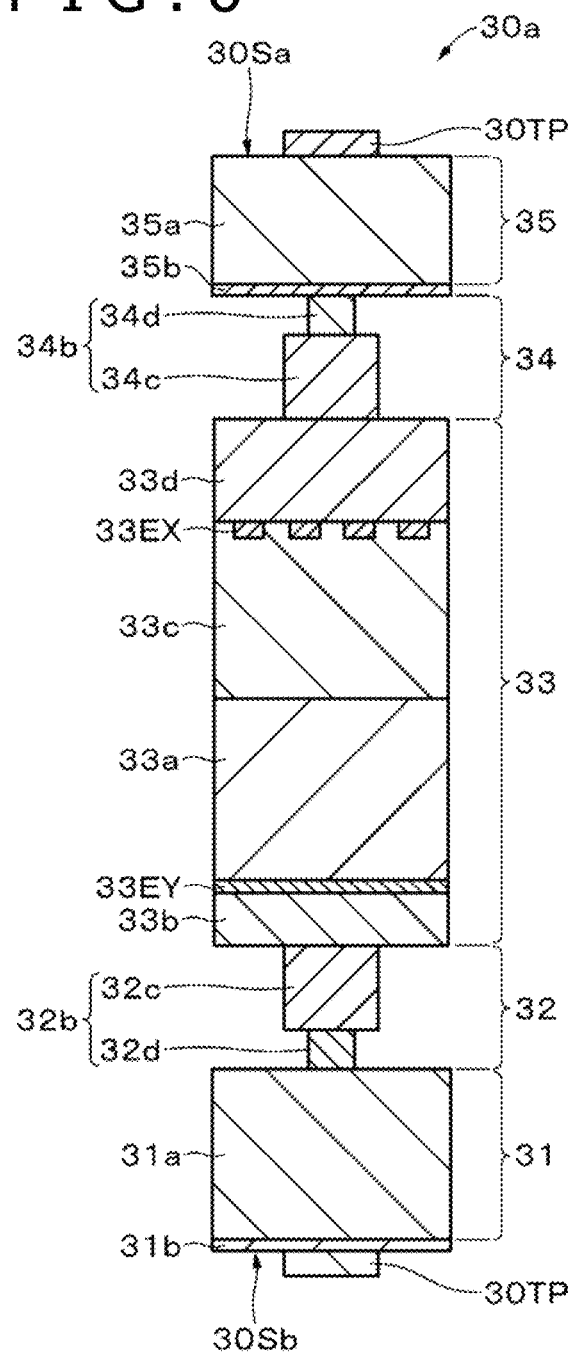
FIG. 6 is a cross-sectional view illustrating the one example of the configuration of the sensor.

The REF electrode layer 31 forms the rear surface of the sensor 30a. The REF electrode layer 35 forms the sensing surface 30Sa of the sensor 30a. The REF electrode layers 31 and 35 are connected, for example, to a ground potential. The REF electrode layer 31 is a conductive substrate having rigidity or flexibility, and as illustrated in FIG. 6, includes the substrate 31a and a conductive layer 31b disposed on the back surface of the substrate 31a. The REF electrode layer 31 is disposed so that the side of its substrate 31a is opposite the back surface of the sensor layer 33. It is to be noted that the REF electrode layer 31 may have flexural rigidity higher than, for example, the sensor layer 33, the REF electrode layer 35 and the like, and may function as a support plate for the sensor 30a. On the other hand, the REF electrode layer 35 is a conductive substrate having flexibility, and as illustrated in FIG. 6, includes the substrate 35a and a conductive layer 35b disposed on the back surface of the substrate 35a. The REF electrode layer 35 is deformable according to the pressing of the sensing surface 30Sa of the sensor 30a. The REF electrode layer 35 is disposed so that the side of its conductive layer 35b is opposite the front surface of the sensor layer 33.

The substrates 31a and 35a have, for example, a film shape or plate shape. The term "film" as used herein shall encompass sheets. As the material of the substrates 31a and 35a, polymer resin or glass can be used, for example.

Illustrative of the polymer resin include polyethylene terephthalate (PET), polyethylene naphthalate (PEN), polycarbonates (PCs), acrylic resins (PMMAs), polyimides (PIs), triacetyl cellulose (TAC), polyesters, polyamides (PAs), aramids, polyethylene (PE), polyacrylates, polyether sulfones, polysulfone, polypropylene (PP), diacetylcellulose, polyvinyl chloride, epoxy resins, urea resins, urethane resins, melamine resins, cyclic olefin polymers (COPs), norbornene-based thermoplastic resins, and the like.

The conductive layers 31b and 35b are only required to have electrical conductivity, and usable examples include inorganic conductive layers containing an inorganic conductive material, organic conductive layers containing an organic conductive material, organic-inorganic conductive layers containing both an inorganic conductive material and an organic conductive material, and the like.

As such inorganic conductive materials, metal, metal oxide and the like can be mentioned, for example. Here, the term "metal" is defined to encompass metalloid. Illustrative of the metal include, but are not limited to, metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, their alloys, and the like. Illustrative of the metal oxide include, but are not limited to, indium-tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide series, indium oxide-tin oxide series, zinc oxide-indium oxide-magnesium oxide series, and the like.

As such organic conductive materials, carbon material, conductive polymer and the like can be mentioned, for example. Illustrative of the carbon material include, but are not limited to, carbon black, carbon fibers, fullerenes, graphenes, carbon nanotubes, carbon microcoils, carbon nanohorns, and the like. Illustrative of the conductive polymer include, but are not limited to, substituted or unsubstituted polyanilines, substituted or unsubstituted polypyrroles, substituted or unsubstituted polythiophenes, (co)polymers containing one or more polymers selected from the above-exemplified conductive polymers, and the like.

Sensor Layer

The sensor layer 33 is disposed between the REF electrode layer 31 and the REF electrode layer 35, and can electrostatically detect a change in the distance to the REF electrode layer 35 as the side of the sensing surface (operation surface) 30Sa and a change in the distance to the REF electrode layer 31 as the side of the back surface 30Sb. Described specifically, the sensor layer 33 includes a plurality of sensor portions 30D, which detect an electrostatic capacitance that changes according to the distance between the sensor layer 33 and the REF electrode layer 31 and the distance between the sensor layer 33 and the REF electrode layer 35. The sensor portions 30D are disposed at equal intervals in the longitudinal direction of the sensor 30a.

The sensor layer 33 is an electrostatic capacitive sensor layer, and as illustrated in FIG. 6, includes a substrate 33a, one or more first electrodes (Y electrodes) 33EY disposed on the back surface of the substrate 33a, an insulating layer 33b covering the one or more first electrodes 33EY, an adhesion layer 33c disposed on the side of a front surface of the substrate 33a, a substrate 33d bonded with the surface of the substrate 33a via the adhesion layer 33c, and one or more second electrodes (X electrodes) 33EX disposed on the side of a back surface of the substrate 33d. The sensor portions 30D are formed of intersections of the one or more first electrodes 33EY and the one or more second electrodes 33EX.

Figure 7A:
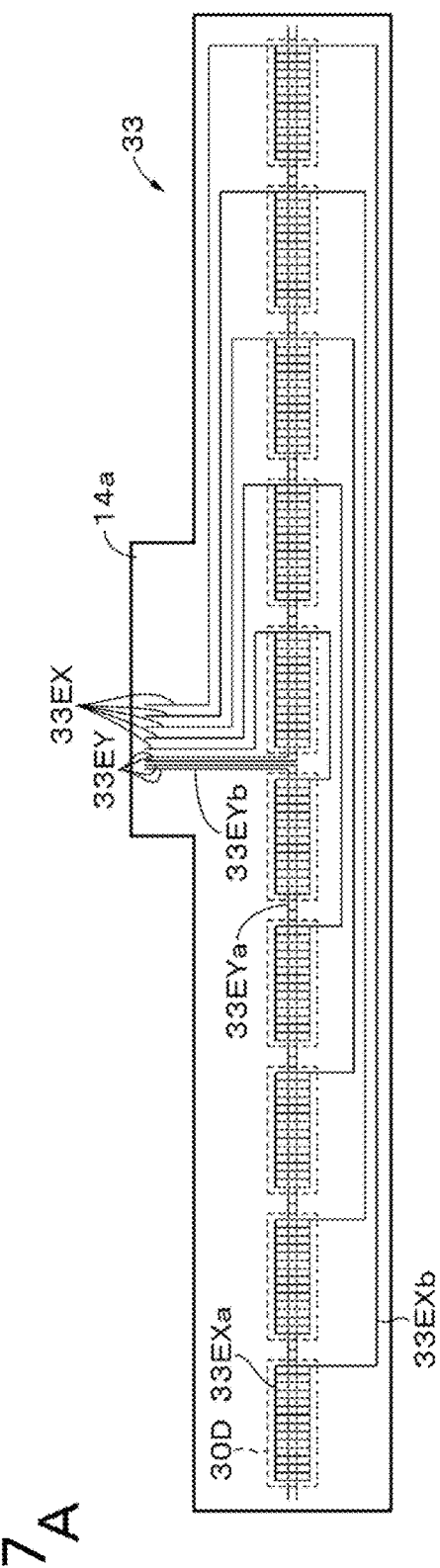
FIG. 7A is a plan view illustrating one examples of configurations of a first and second electrode.

With reference to FIGS. 7A and 7B, a description will now be made about examples of the configurations of the first and second electrodes 33EY and 33EX. Here, the description will be made about an example that the plural sensor portions 30D are formed of intersections between four first electrodes 33EY and five second electrodes 33EX.

The first electrodes 33EY include electrode traces 33EYa disposed extending in the longitudinal direction of the sensor 30a, and lead traces 33EYb led out from one ends of the electrode traces 33EYa. The electrode traces 33EYa have, for example, a linear form. The second electrodes 33EX include two unit electrode portions 33EXa and connection traces 33EXb connecting these unit electrode portions 33EXa. The unit electrode portions 33EXa have, for example, a comb, ladder, or mesh form. Over the electrode traces 33EYa disposed extending in the longitudinal direction of the sensor 30a, the unit electrode portions 33EXa are disposed. The sensor portions 30D are formed of overlapping portions between the electrode traces 33EYa and the unit electrode portions 33EXa.

The unit electrode portions 33EXa form a single line that extends in the longitudinal direction of the sensor 30a. The four electrode traces 33EYa are disposed extending in the direction of the above-described line so that they overlap the unit electrode portions 33EXa in the thickness direction of the sensor 30a. Described specifically, of the four electrode traces 33EYa, two electrode traces 33EYa that extend in parallel to each other are disposed extending from one end to substantially the middle of the line with a predetermined interval being left therebetween. The remaining two electrode traces 33EYa that extend in parallel to each other are disposed extending from the other end to substantially the middle of the line with a predetermined interval being left therebetween. The unit electrode portions 33EXa that are located at positions symmetrical to each other with respect to the middle of the line are electrically connected to each other by the connection traces 33EXb.

As the first and second electrodes 33EY and 33EX are laid out as described above, the first and second electrodes 33EY and 33EX can be laid out efficiently. In addition, the FPC 14a can be easily disposed at any position out of the long sides of the elongated sensor layer 33. It is to be noted that FIG. 7A illustrates an example that the FPC 14a are disposed at the middle of one of the long sides of the elongated sensor layer 33.

The electrode traces 33EYa that are adjacent each other in the transverse direction of the sensor 30a are electrically connected to each other by plural connecting portions 33EYc. Consequently, the function as the sensor 30a can be maintained even if one of the two electrode traces 33EYa disposed in parallel to each other is disconnected. Hence, the sensor 30a is provided with improved durability. The connecting portions 33EYc may preferably be disposed between the unit electrode portions 33Exa that are adjacent each other in the longitudinal direction of the sensor 30a.

The substrates 33a and 33d are similar to the above-described substrates 31a and 35a.

As the material of the insulating layer 33b, ultraviolet (UV) curable resin, thermosetting resin, insulating resist, metal compound, or the like can be used. Specific usable examples include resin materials such as polyacrylates, polyvinyl alcohol (PVA), polystyrene (PS), polyimides, polyesters, epoxy resins, polyvinylphenol, and polyvinyl alcohol, and metal compounds such as $SiO_2$, $SiN_x$, $SiON$, $Al_2O_3$, $Ta_2O_5$, $Y_2O_3$, $HfO_2$, $HfAlO$, $ZrO_2$, and $TiO_2$.

The adhesion layer 33c may be formed, for example, of an adhesive having insulating property or a double-faced adhesive tape. As the adhesive, one or more adhesives selected from the group consisting of acrylic adhesives, silicone-based adhesives, and urethane-based adhesives can be used, for example. The term "pressure-sensitive adhesion" as used herein is defined as a kind of adhesion. According to this definition, a pressure-sensitive adhesion layer is considered to be a kind of adhesion layer.

Space Layers

The space layer 32 includes a frame 32a as a peripheral edge structure part, and plural structure parts 32b. The frame 32a and the structure parts 32b are disposed between the REF electrode layer 31 and the sensor layer 33 to separate the REF electrode layer 31 and sensor layer 33 from each other. The structure parts 32b are linearly disposed at predetermined intervals in the longitudinal direction of the sensor 30a. When the sensor 30a is viewed from the direction perpendicular to the sensing surface 30Sa, the structure parts 32b are disposed at positions between the adjacent sensor portions 30D or at the positions of the sensor portions 30D. In FIGS. 5A to 5C, the latter example of disposition is illustrated.

As illustrated in FIG. 6, each structure part 32b includes a structure portion 32c and a bonding portion 32d. The structure portion 32c can be, for example, conical, columnar (e.g., cylindrical or polygonal cylindrical), acicular, partial spherical (e.g., hemispherical), partial ellipsoidal (e.g., hemiellipsoidal), polygonal, or the like. However, the structure portion 32c shall not be limited to such a shape, and may be configured to adopt a different shape.

The bonding portion 32d is disposed on the structure portion 32c, and the structure portion 32c and the REF electrode layer 31 are bonded together via the bonding portion 32d. As the material of the structure portion 32c, a resin material having insulating property is used, for example. As such a resin material, a photocurable resin such as a UV curable resin can be used. As the material of the bonding portion 32d, a resin material having pressure-sensitive adhesiveness or the like can be used, for example.

The configuration of each structure part 32b is not limited to the configuration that the structure portion 32c and the bonding portion 32d are discrete from each other as described above, and may adopt a configuration that the structure portion 32c and the bonding portion 32d have been integrally formed beforehand. In this modification, as the material of the structure part 32b, a material that can realize both the functions of the structure portion 32c and the bonding portion 32d can be selected, for example.

The frame 32a is disposed continuously or discontinuously between the REF electrode layer 31 and the sensor layer 33 along peripheral edge portions thereof. As the material of the frame 32a, a resin material having pressure-sensitive adhesiveness and insulating property can be used, for example. The frame 32a has not only a function as a separating part that separates the REF electrode layer 31 and the sensor layer 33 from each other, but also a function as a bonding portion that bonds the REF electrode layer 31 and the sensor layer 33 together.

The space layer 34 includes a frame 34a as a peripheral edge structure part, and plural structure parts 34b. The frame 34a and the structure parts 34b are disposed between the REF electrode layer 35 and the sensor layer 33 to separate the REF electrode layer 35 and the sensor layer 33 from each other. The structure parts 34b are linearly disposed at predetermined intervals in the longitudinal direction of the sensor 30a. When the sensor 30a is viewed from the direction perpendicular to the sensing surface 30Sa, the structure parts 34b are disposed at positions between the adjacent sensor portions 30D or at the positions of the sensor portions 30D. It is to be noted that, in FIGS. 5A to 5C, the former example of disposition is illustrated. However, the structure parts 32b and 34b are disposed so that they do not overlap in the thickness direction of the sensor 30a. Described specifically, the structure parts 34b are disposed at the positions of the sensor portions 30D if the structure parts 32b are disposed at positions between the adjacent sensor portions 30D. In contrast, the structure parts 34b are disposed at positions between the adjacent sensor portions 30D if the structure parts 32b are disposed at the positions of the sensor portions 30D.

As illustrated in FIG. 6, each structure part 34b includes a structure portion 34c and a bonding portion 34d. The structure portion 34c can be, for example, conical, columnar (e.g., cylindrical or polygonal cylindrical), acicular, partial spherical (e.g., hemispherical), partial ellipsoidal (e.g., hemiellipsoidal), polygonal, or the like. However, the structure portion 34c shall not be limited to such a shape, and may be configured to adopt a different shape.

The bonding portion 34d is disposed on the structure portion 34c, and the structure portion 34c and the REF electrode layer 35 are bonded together via the bonding portion 34d. As the material of the structure portion 34c, a resin material having insulating property is used, for example. As such a resin material, a photocurable resin such as a UV curable resin can be used. As the material of the bonding portion 34d, a resin material having pressure-sensitive adhesiveness or the like can be used, for example.

It is to be noted that the configuration of each structure part 34b is not limited to the configuration that the structure portion 34c and the bonding portion 34d are discrete from each other as described above, and may adopt a configuration that the structure portion 34c and the bonding portion 34d have been integrally formed beforehand. In this modification, as the material of the structure part 34b, a material that can realize both the functions of the structure portion 34c and the bonding portion 34d can be selected, for example.

The frame 34a is disposed continuously or discontinuously between the REF electrode layer 35 and the sensor layer 33 along peripheral edge portions thereof. As the material of the frame 34a, a resin material having pressure-sensitive adhesiveness and insulating property can be used, for example. The frame 34a has not only a function as a separating part that separates the REF electrode layer 35 and the sensor layer 33 from each other, but also a function as a bonding portion that bonds the REF electrode layer 35 and the sensor layer 33 together.

1.5 Detection Operation by Sensor

Figure 8:
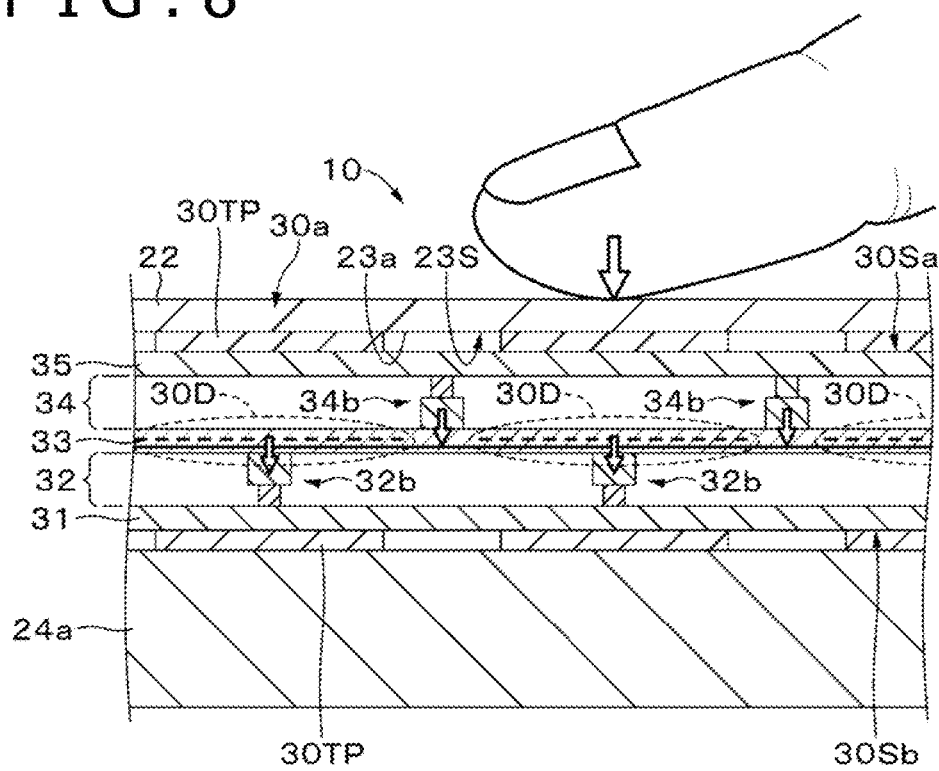
FIG. 8 is a cross-sectional view illustrating one example of an operation of the sensor upon input operation.

With reference to FIG. 8, a description will hereinafter be made about one example of a detection operation by the sensor 30a. It is to be noted that the open arrows in FIG. 8 indicate the directions of forces to be applied to the structure parts 32b and 34b by pressing the sensing surface 30Sa of the sensor 30a.

If the sensing area 30Ra is pressed (operated for input) by a pointer such as a finger, the casing 20 is slightly deformed at the sensing area 30Ra, and by this deformation, the sensing surface 30Sa of the sensor 30a is pressed. Consequently, the distance between the REF electrode layer 31 and the sensor layer 33 and the distance between the REF electrode layer 35 and the sensor layer 33 change. The sensor portions 30D included in the sensor layer 33 electrostatically detect these changes. The detection results are outputted as electrostatic capacitance distributions, in other words, pressure distributions to the host processor 11 via the controller IC 12a.

1.6 Operations of Electrical Apparatus

Figure 9:
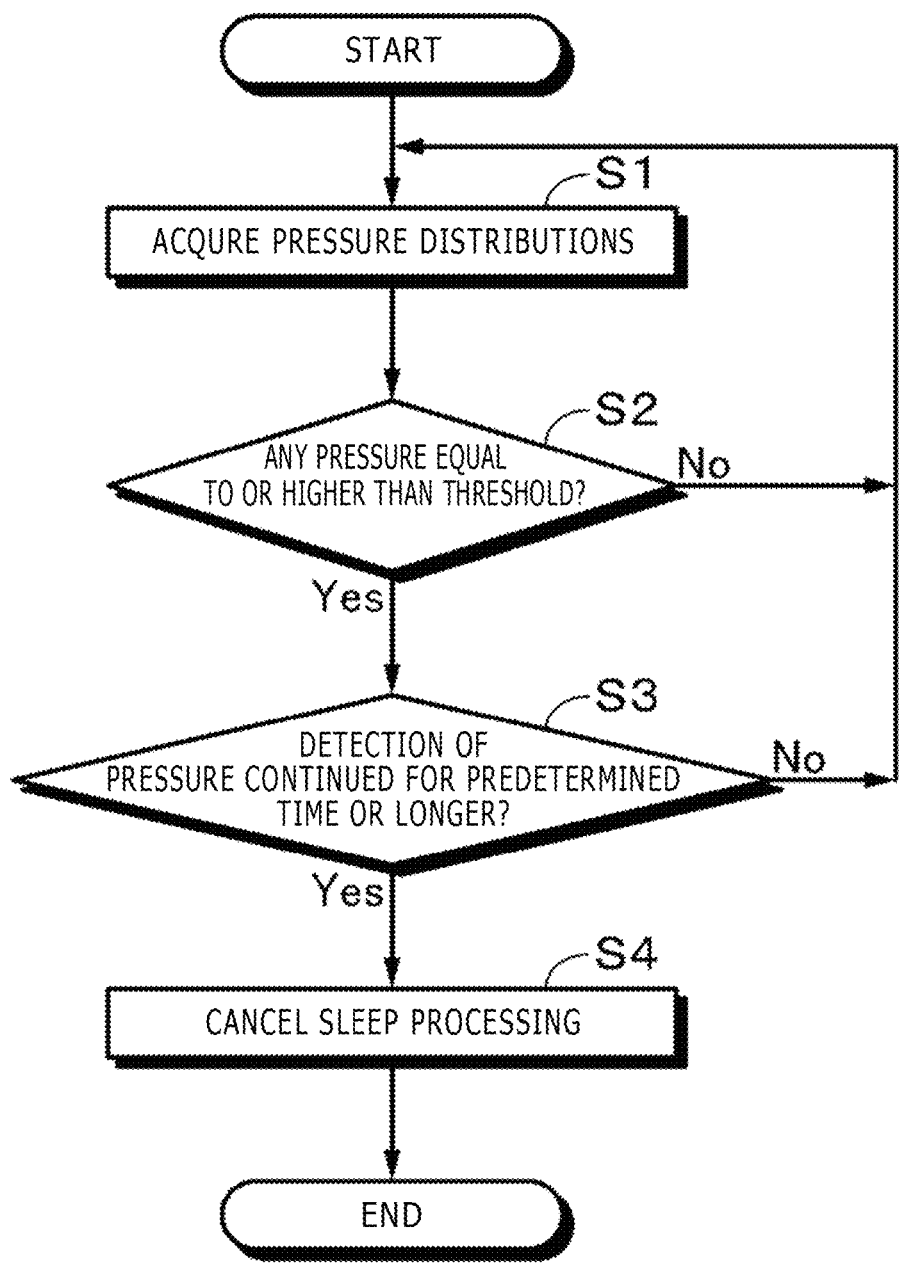
FIG. 9 is a flow chart illustrating examples of operations of the electrical apparatus according to the first embodiment of the present technology.

Referring to FIG. 9, a description will hereinafter be made about examples of operations of the electrical apparatus 10 according to the first embodiment of the present technology. It is to be noted that processing at the host processor 11, which will be described below, is performed, specifically by the control unit included in the host processor 11.

In step S1, the host processor 11 as the main unit of the electrical apparatus 10 first acquires pressure distributions from the sensors 30a and 30b via the controller ICs 12a and 12b. In step S2, the host processor 11 then determines, on the basis of the acquired pressure distributions, whether or not a pressure of a threshold or higher is being applied to the sensor 30a or 30b via the sensing area 30Ra or 30Rb.

If it is determined in step S2 that the pressure of the threshold or higher is being applied to the sensor 30a or 30b, the host processor 11 determines in step S3 whether or not the detection of the pressure of the threshold or higher has continued for a predetermined time or longer. If it is determined in step S2 that the pressure of the threshold or higher is not being applied to the sensor 30a or 30b, on the other hand, the host processor 11 returns the processing to step S1.

If it is determined in step S3 that the detection of the pressure of the threshold or higher has continued for the predetermined time or longer, the host processor 11 in step S4 cancels sleep processing at the electrical apparatus 10. If it is determined in step S3 that the detection of the pressure has not continued for the predetermined time or longer, on the other hand, the host processor 11 returns the processing to step S1.

1.7 Effects

The electrical apparatus 10 according to the first embodiment includes the second casing 22 having the recesses 23a and 23b in the inner surface 22SI and the pressure-sensitive sensors 30a and 30b disposed in the recesses 23a and 23b to detect pressing applied to an outer surface of the second casing 22. The sensors 30a and 30b are fixed in the recesses 23a and 23b so that the sensing surfaces 30Sa of the sensors 30a and 30b are in contact with the bottom surfaces 23S of the recesses 23a and 23b. Consequently, if the sensing area 30Ra or 30Rb located on the back side of the bottom surface 23S of the recess 23a or 23b is pressed by a pointer such as a finger, the bottom surface 23S of the recess 23a or 23b slightly flexes, whereby the sensing surface 30S of the sensor 30a or 30b is pressed by the bottom surface 23S of the recess 23a or 23b. Accordingly, the sensor 30a or 30b can detect the pressing applied to the sensing area 30Ra or 30Rb on the back side of the bottom surface 23S of the recess 23a or 23b.

1.8 Modifications

In the above-described first embodiment, the description was made about the examples that the sensing areas 30Ra and 30Rb are also formed of the second casing 22 that makes up the back surface 10Sb of the electrical apparatus 10 in its entirety. However, only the parts of the sensing areas 30Ra and 30Rb may be formed of another casing other than the second casing 22.

In the above-described first embodiment, the description was made about the examples that the casing 20 is formed in its entirety of the material having rigidity. However, the parts of the sensing areas 30Ra and 30Rb or parts including the sensing areas 30Ra and 30Rb in the casing 20 may be formed of the material having rigidity.

The pressure-sensitive sensors are not limited to the sensors 30a and 30b in the above-described first embodiment, and general, sheet-shaped pressure-sensitive sensors or the like can be also used. However, the sensors 30a and 30b in the above-described first embodiment can be preferably used from the viewpoint of providing the sensing areas 30Ra and 30Rb with an improved detection sensitivity.

The REF electrode layers 31 and 35 may be formed only of the conductive layers 31b and 35b, respectively. In this modification, insulating layers may be disposed on the surfaces of the conductive layers 31b and 35b.

Figure 10:
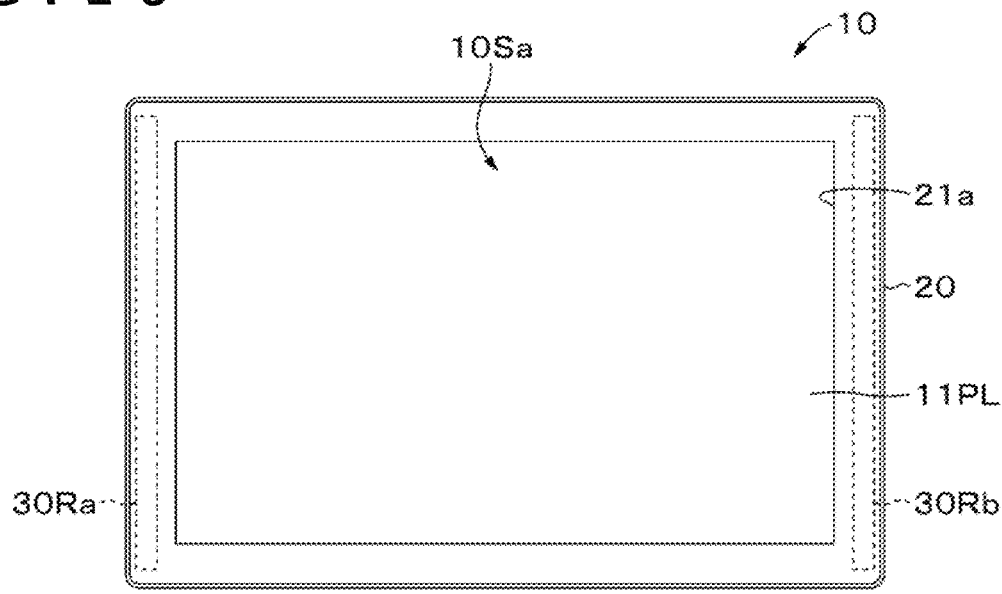
FIG. 10A is a front surface view illustrating one example of an external appearance of an electrical apparatus according to a modification of the first embodiment of the present technology.
FIG. 10B is a cross-sectional view illustrating one example of a configuration of a sensing area.
FIG. 10C is a back surface view illustrating the one example of the external appearance of the electrical apparatus according to the modification of the first embodiment of the present technology.
Figure 10:
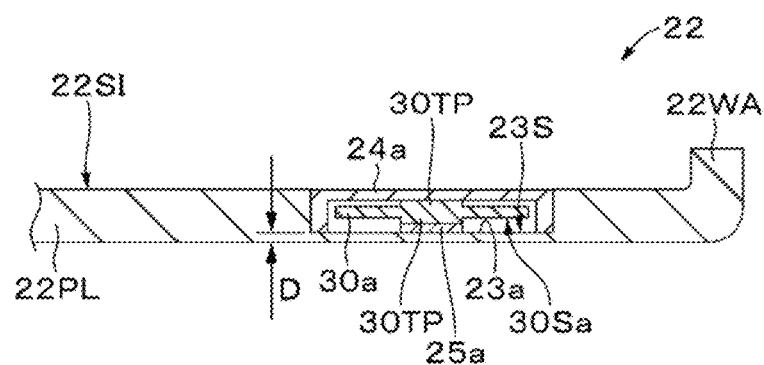
Figure 10:
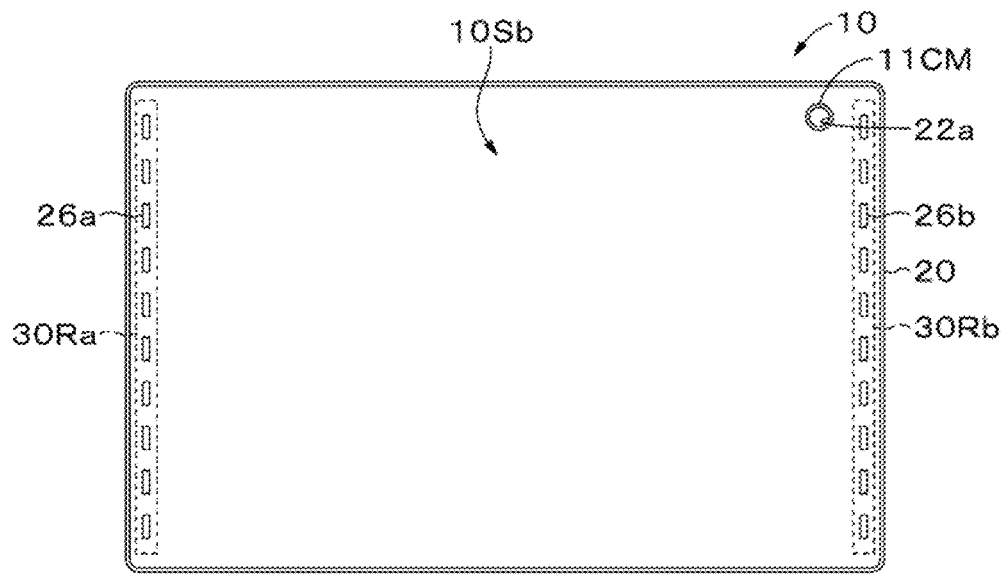

As illustrated in FIG. 10A, the sensing areas 30Ra and 30Rb may be disposed at longitudinally opposite end parts of the front surface 10Sa of the electrical apparatus 10. In this modification, the sensing areas 30Ra and 30Rb may also be disposed at longitudinally opposite end parts of the back surface 10Sb of the electrical apparatus 10, or may not be disposed on the back surface 10Sb.

Figure 11:
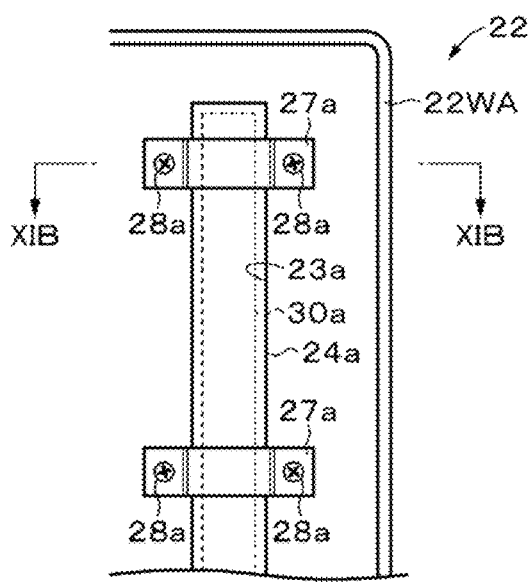
FIG. 11A is a plan view illustrating another example of the configuration of the sensing area.
FIG. 11B is a cross-sectional view taken along line XIB-XIB of FIG. 11A.
FIGS. 11C and 11D are cross-sectional views of configuration examples of the sensor.
Figure 11:
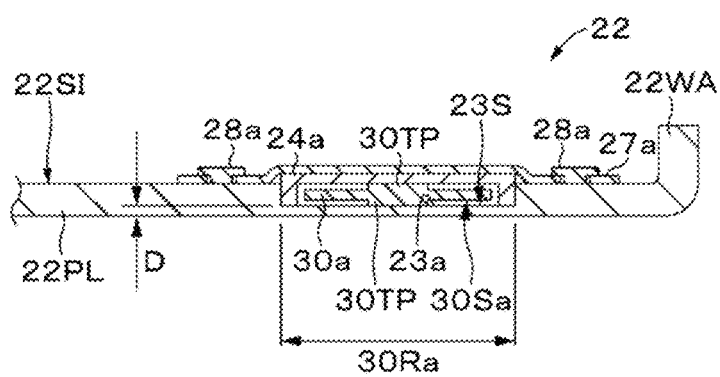
Figure 11:
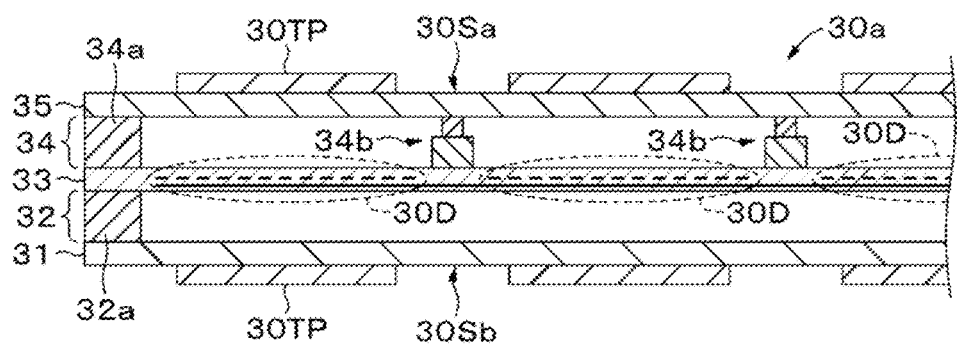
Figure 11:
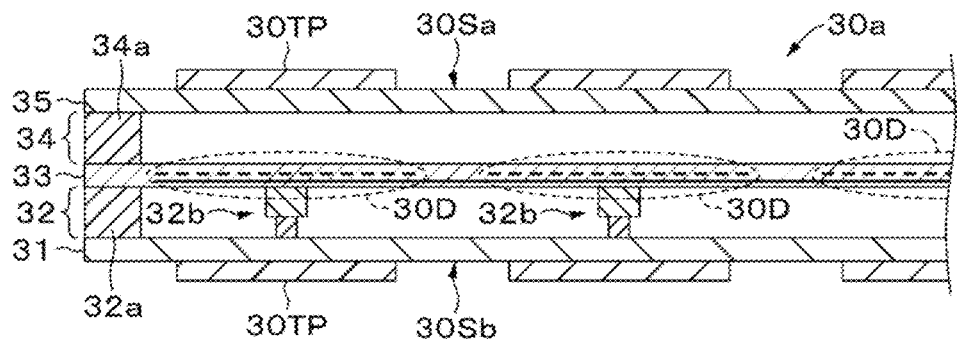

As illustrated in FIG. 10B, the sensing surface 30Sa of the sensor 30a and the bottom surface 23S of the recess 23a in the second casing 22 may be boned together by an adhesion layer 25a. In this modification, it is preferred, from the viewpoint of providing the sensing area 30Ra with an improved detection sensitivity, to dispose a back plate 24a as illustrated in FIG. 11B. Nonetheless, the back plate 24a may be omitted. The adhesion layer 25a is, for example, similar to the adhesion layer 33c in the first embodiment. The adhesion layer 25a may be formed, for example, of an adhesive having insulating property or a double-faced adhesive tape.

As illustrated in FIG. 10C, one or more raised portions 26a and 26b may preferably be disposed on the sensing areas 30Ra and 30Rb, respectively. Consequently, the positions of the sensing areas 30Ra and 30Rb can be easily ascertained by touching the one or more raised portions 26a and 26b with a finger or the like, even if the sensing areas 30Ra and 30Rb are disposed on the back surface 10Sb of the electrical apparatus 10. The one or more raised portions 26a and 26b may preferably be disposed on the sensor portion or portions 30D included in the sensors 30a and 30b, because the sensing areas 30Ra and 30Rb can be provided with an improved detection sensitivity.

As illustrated in FIGS. 11A and 11B, one or more spring plates 27a may be disposed as a fixing member or fixing members to fix the back plate 24a. Each spring plate 27a is fixed on the inner surface 22SI of the second casing 22, for example, by one or more screw members 28a. The spring plates 27a may preferably be fixed in such a way that they press the back plates 24a against the back surface 30Sb of the sensor 30a, because the sensing area 30Ra can be provided with an improved detection sensitivity. If only one spring plate 27a is disposed, the single spring plate 27a may preferably be configured to cover the back plate 24a in its entirety. Similarly to the foregoing, one or more spring plates may be disposed as a fixing member or fixing members to fix the back plate 24b.

Each spring plate 27a is made, for example, of polymer resin or metal. Each spring plate 27a may have a stacked structure of a polymer resin layer and a metal layer. As the polymer resin, those which are similar to the polymer resins of the substrates 31a and 35a in the first embodiment can be exemplified. As the metal, those which are similar to the metal of the casing 20 in the first embodiment can be exemplified.

As illustrated in FIG. 11C, the structure parts 34b may be disposed only in the space layer 34 without disposing any structure parts in the space layer 32. In this modification, when the sensor 30a is viewed from the direction perpendicular to the sensing surface 30Sa, the structure parts 34b are disposed at positions between the adjacent sensor portions 30D or at the positions of the sensor portions 30D. It is to be noted that in FIG. 12A, the former example of disposition is illustrated.

As illustrated in FIG. 11D, the structure parts 32b may be disposed only in the space layer 32 without disposing any structure parts in the space layer 34. In this modification, when the sensor 30a is viewed from the direction perpendicular to the sensing surface 30Sa, the structure parts 32b are disposed at positions between the adjacent sensor portions 30D or at the positions of the sensor portions 30D. It is to be noted that in FIG. 12B, the latter example of disposition is illustrated.

Figure 12:
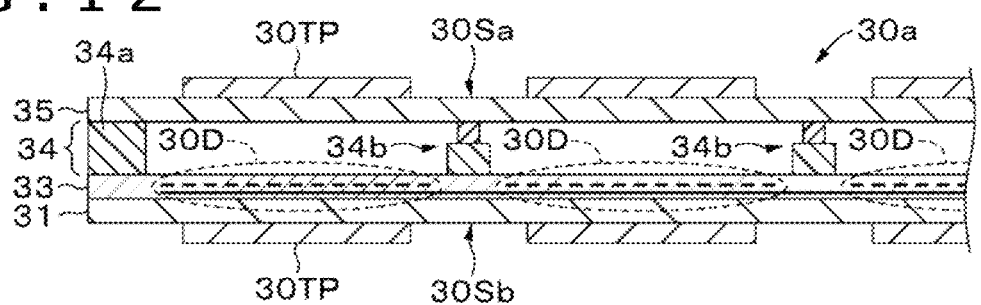
FIGS. 12A to 12D are cross-sectional views illustrating configuration examples of the sensor.
Figure 12:
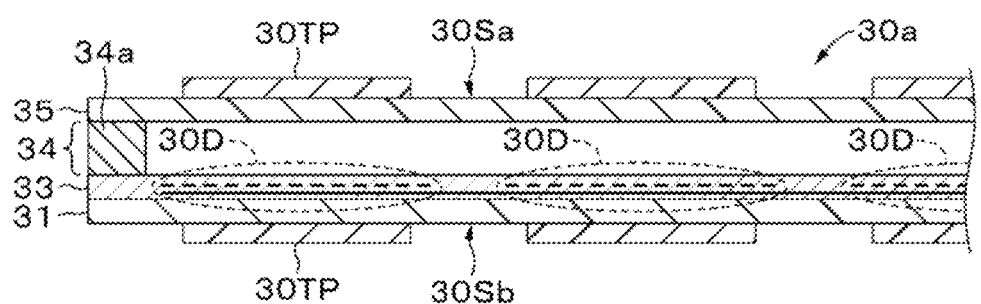
Figure 12:
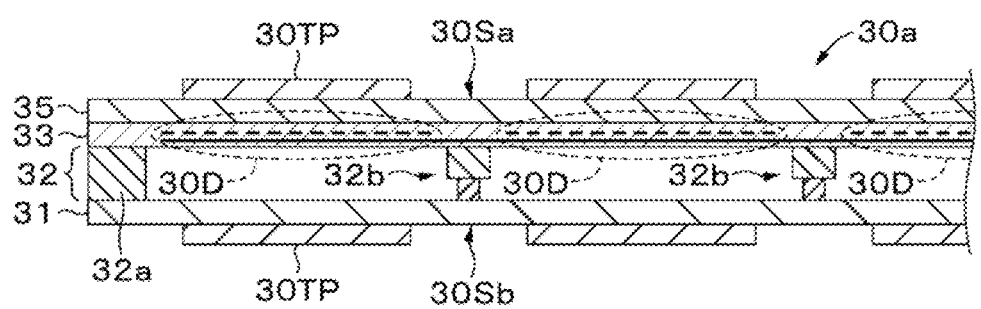
Figure 12:
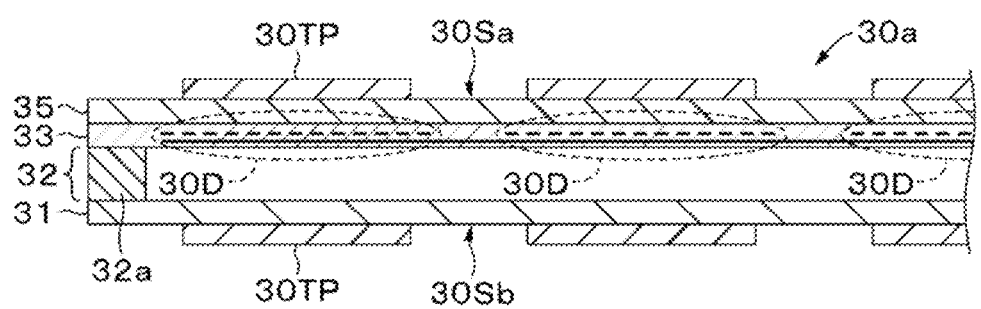

As illustrated in FIG. 12A, the REF electrode layer 31 and the sensor layer 33 may be disposed in contact with each other without disposing any space layer between the REF electrode layer 31 and the sensor layer 33. In this modification, in the space layer 34, when the sensor 30a is viewed from the direction perpendicular to the sensing surface 30Sa, the structure parts 34b are disposed at positions between the adjacent sensor portions 30D. In this configuration, as illustrated in FIG. 12B, the REF electrode layer 35 and the sensor layer 33 may be separated from each other only by the frame 34a without disposing any structure parts 34b between the REF electrode layer 35 and the sensor layer 33.

As illustrated in FIG. 12C, the REF electrode layer 35 and the sensor layer 33 may be disposed in contact with each other without disposing any space layer between the REF electrode layer 35 and the sensor layer 33. In this modification, when the sensor 30a is viewed from the direction perpendicular to the sensing surface 30Sa, the structure parts 34b are disposed in the space layer 32 at positions between the adjacent sensor portions 30D. In this configuration, as illustrated in FIG. 12D, the REF electrode layer 31 and the sensor layer 33 may be separated from each other only by the frame 32a without disposing any structure parts 32b between the REF electrode layer 31 and the sensor layer 33.

Figure 13:
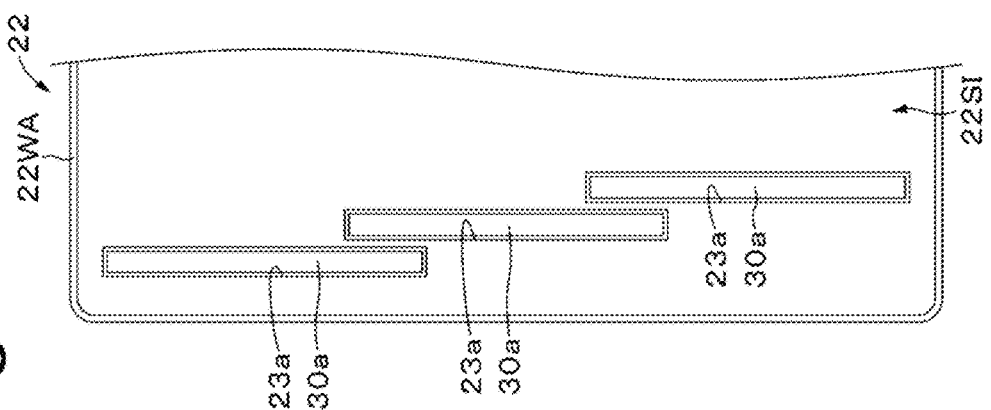
FIGS. 13A to 13C are plan views illustrating configuration examples of the sensing area.
Figure 13:
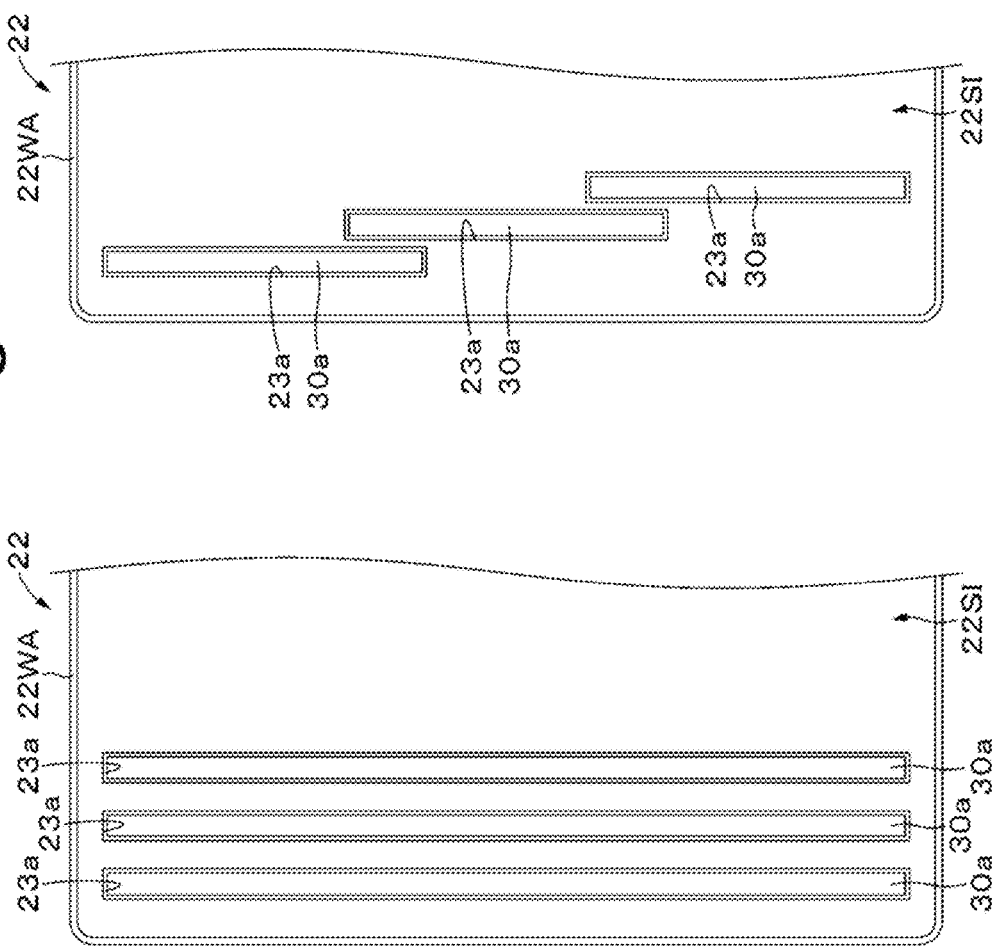
Figure 13:
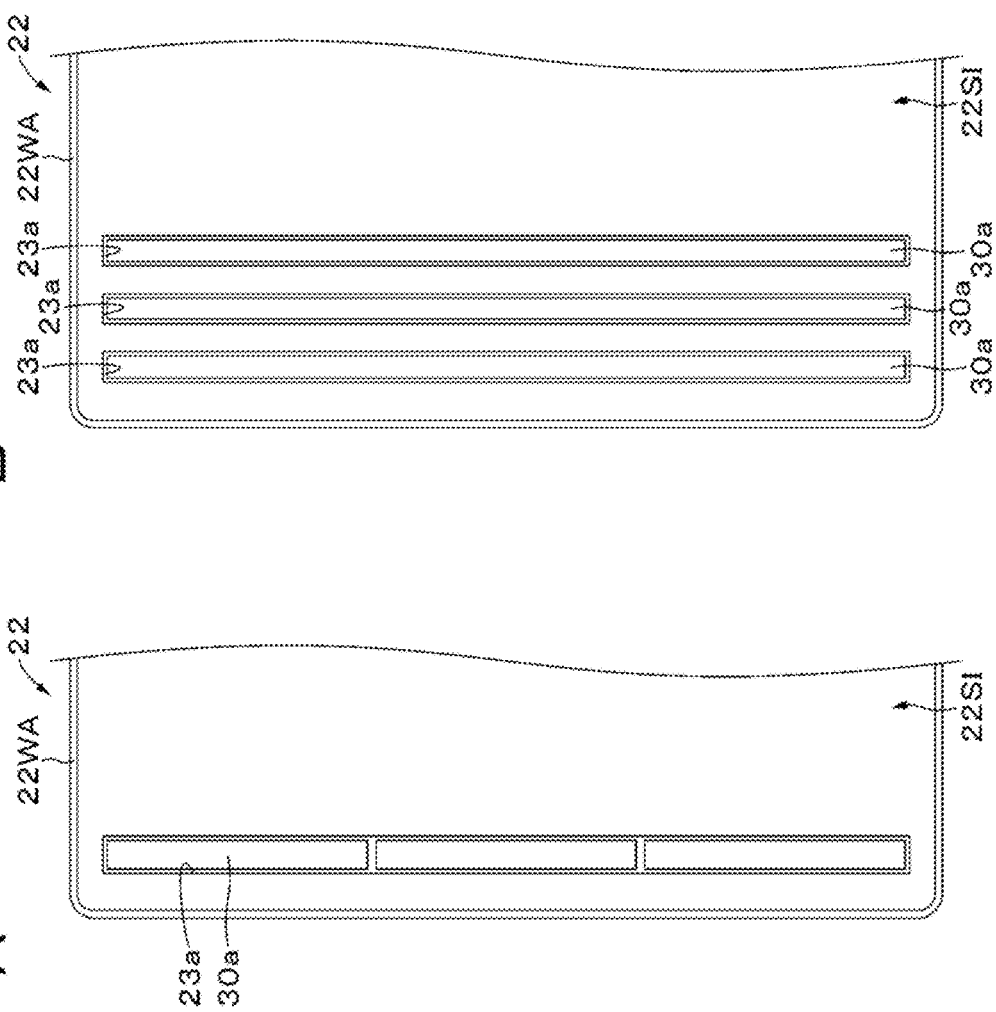

As illustrated in FIG. 13A, plural elongated pressure-sensitive sensors 30a may be disposed in recesses 23a. In this modification, the pressure-sensitive sensors 30a may preferably be disposed in the recesses 23a while being separated from one another in the longitudinal direction of the pressure-sensitive sensors 30a, because the occurrence of dislocations, separations or the like of the pressure-sensitive sensors 30a can be refrained even if the pressure-sensitive sensors 30a expand or shrink due to temperature changes in the electrical apparatus 10. Preferably, the elongated pressure-sensitive sensors 30b may also have a similar configuration as the above-described pressure-sensitive sensor 30a.

As illustrated in FIG. 13B, a plurality of recesses 23a may be disposed in a longitudinal end part of the inner surface 22SI so that the recesses 23a extend in the transverse direction of the inner surface 22SI and form a like plural number of lines. Elongated pressure-sensitive sensors 30 may be disposed in the recesses 23a individually. In this modification, it is possible to refrain dislocations, separations or the like of the pressure-sensitive sensors 30a, which would occur through expansion and shrinkage. Further, sensors 30a may be arranged in plural lines with functions assigned one by one to the respective lines, whereby the sensors 30a can function as matrix nodes to realize gesture actions.

If plural recesses 23a form a like plural number of lines as described above, these lines may be disposed so that as illustrated in FIG. 13C, the recesses 23a which are adjacent one another in a direction orthogonal to the direction of extended disposition of the recesses 23a (in the longitudinal direction of the inner surface 22SI) may be disposed so that the recesses 23a themselves are stepwise shifted in the direction of the extended disposition of the recesses 23a. It is to be noted that the illustration of back plates 24a is omitted in FIGS. 13A to 13C.

In the first embodiment described above, the description was made about the examples that the plural raised portions 30TP are disposed on at least one of the sensing surface 30Sa and the back surface 30Sb of the sensor 30a. However, plural raised portions may be disposed on at least one of the sensing surface 30Sa of the sensor 30a and the bottom surface 23S of the recess 23a. Similarly to the foregoing, plural raised portions may be disposed on at least one of the sensing surface 30Sa and the bottom surface 23S of the recess 23b in the sensor 30b.

In the first embodiment described above, the description was made about the examples that the plural raised portions 30TP are disposed on at least one of the sensing surface 30Sa and back surface 30Sb of the sensor 30a. However, a single raised portion may be disposed on at least one of the sensing surface 30Sa and the back surface 30Sb of the sensor 30a. In this modification, the raised portion 30TP is disposed at a middle position in the transverse direction (width direction) of the sensor 30a, and is disposed extending in the longitudinal direction of the sensor 30a.

In the first embodiment described above, the description was made about the example that the sleep mode is cancelled by pressing the sensing area 30Ra or 30Rb. However, an operation of the electrical apparatus other than the cancellation of the sleep mode may be performed by pressing the sensing area 30Ra or 30Rb. For example, the electrical apparatus may be configured to perform volume control of outputting voice, brightness control of the screen, switching to the sleep mode operation, or the like by pressing the sensing area 30Ra or 30Rb.

In the first embodiment described above, the description was made about the example that the host processor 11 determines whether or not the detection of a pressure equal to or higher than the threshold has continued for the predetermined time or longer and performs the predetermined operation (sleep mode cancellation) of the electrical apparatus on the basis of the results of the determination. However, the detection operation by the electrical apparatus 10 shall not be limited to the example. For example, the electrical apparatus may be configured so that the host processor 11 determines whether or not pressures equal to or higher than a threshold have been detected a predetermined number of times or more and a predetermined operation of the electrical apparatus is performed if the pressures equal to or higher than the threshold have been detected the predetermined number of times or more. As an alternative, the electrical apparatus may also be configured so that the host processor 11 determines whether or not pressures equal to or higher than a threshold have been detected over a predetermined width or greater and a predetermined operation of the electrical apparatus is performed if the pressures equal to or higher than the threshold have been detected over the predetermined width or greater.

In the first embodiment described above, the description was made about the examples that the electrical apparatus is a tablet computer. However, the present technology shall not be limited to such a tablet computer, but can be applied to a variety of electrical apparatus that have an exterior body such as a casing. For example, the present technology can be applied to personal computers, mobile phones such as smart phones, television sets, cameras, game consoles, navigation systems, digital books, electronic dictionaries, portable music players, wearable terminals such as smart watches and head mounted displays, radios, electric tools, refrigerators, air conditioners, wearable devices, stereo audio systems, hot water dispensers, microwave ovens, dish washers, washing machines, laundry dryers, lighting equipment, toys, medical equipment, robots, and the like. It is to be noted that the term "electrical apparatus" shall encompass so-called electronic apparatus. Further, the casing is an example of an exterior body having rigidity.

Furthermore, the present technology shall not be limited to electrical apparatus, but can also be applied to various things and items other than electrical apparatus. For example, the present technology can be applied to buildings led by houses, building components, vehicles, furniture such as tables and desks, manufacturing equipment, analysis instruments, and the like. Illustrative of the building components include paving stones, wall components, floor tiles, floor boards, and the like. Illustrative of the vehicles include motor vehicles (e.g., automobiles, motorcycles, and the

2. Second Embodiment

2.1 External Appearance of Electrical Apparatus

Figure 14:
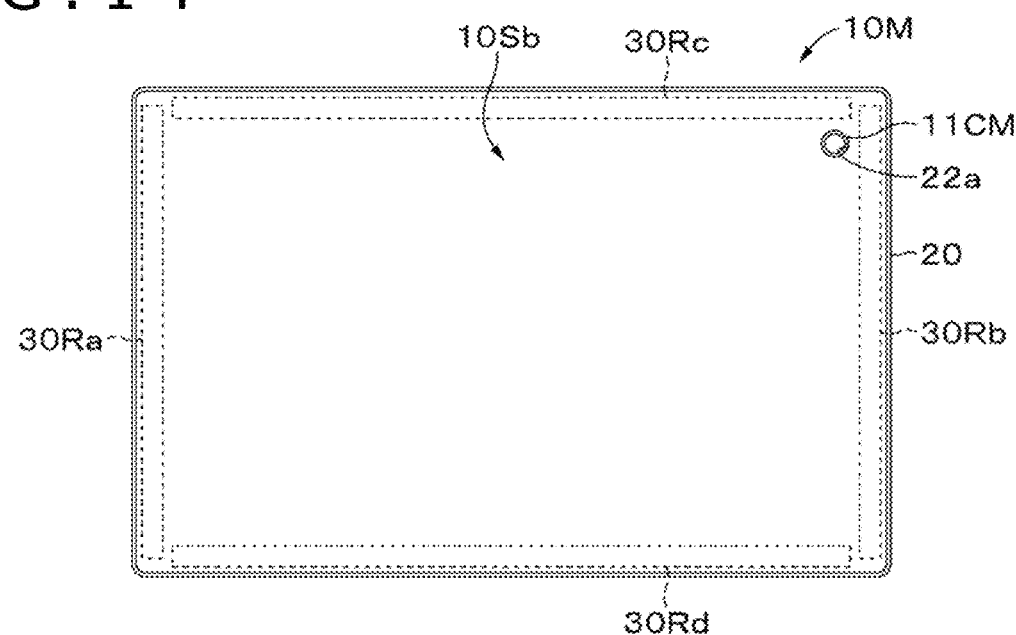
FIG. 14A is a rear view illustrating one example of an external appearance of an electrical apparatus according to a second embodiment of the present technology.
FIG. 14B is a plan view illustrating one example of a configuration of sensing areas.
Figure 14:
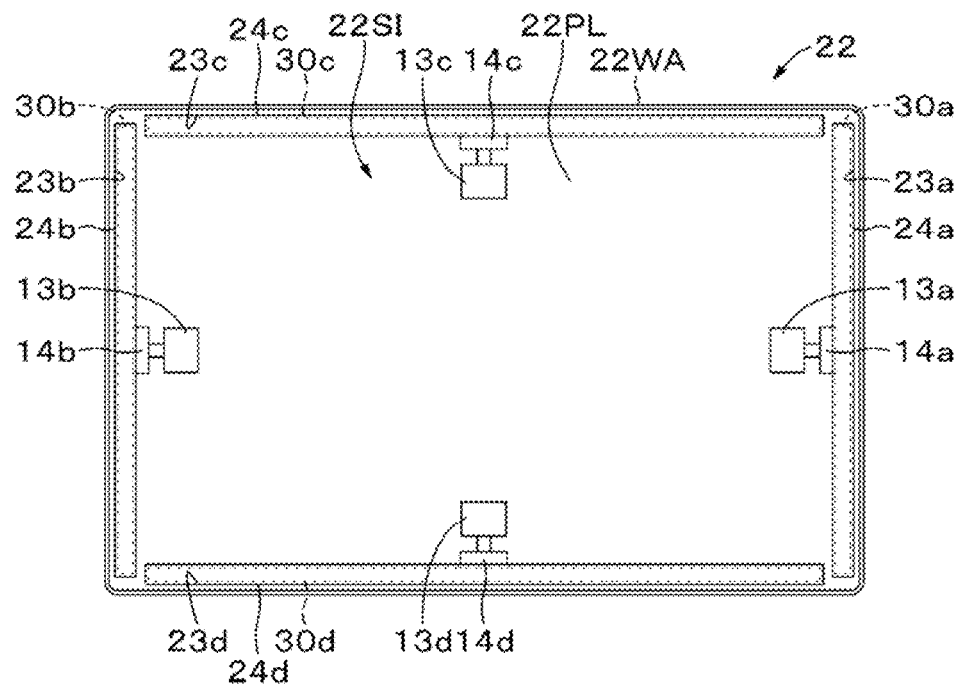

As illustrated in FIG. 14A, in an electrical apparatus 10M according to a second embodiment of the present technology, sensing areas 30Rc and 30Rd are disposed at transversely opposite end parts individually of the back surface 10Sb of the electrical apparatus 10M. The sensing areas 30Rc and 30Rd are disposed along the long sides of the back surface 10Sb. Therefore, the sensing areas 30Ra, 30Rb, 30Rc, and 30Rd are disposed along the respective four sides that the back surface 10Sb of the electrical apparatus 10M has.

2.2 Configuration of Sensing Areas

As illustrated in FIG. 14B, the second casing 22 includes recesses 23c and 23d at positions on the back side of the sensing areas 30Rc and 30Rd. Described specifically, the recesses 23c and 23d are disposed in transversely opposite end parts individually of the inner surface 22SI. The recesses 23c and 23d are disposed extending in the longitudinal direction of the inner surface 22SI. Described specifically, the recesses 23c and 23d are disposed extending along the long sides of the inner surface 22SI. The recesses 23c and 23d each have a size and shape substantially the same as those of the sensing areas 30Rc and 30Rd. The bottom surfaces of the recesses 23c and 23d have a planar form.

In the recess 23c, a sensor 30c and a back plate 24c as a fixing member are accommodated. Further, the sensor 30c is electrically connected to a PCBA 13c via FPC 14c. Similarly, the sensor 30d and a back plate 24d as a fixing member are accommodated in the recess 23d. Further, a sensor 30d is electrically connected to a PCBA 13d via FPC 14d. A further recess may be disposed in the inner surface 22SI of the second casing 22 to accommodate the FPC 14c therein, and this further recess may be integrally joined together with the recess 23c. Similarly, a still further recess may be disposed in the inner surface 22SI of the second casing 22 to accommodate the FPC 14d therein, and this still further recess may be integrally joined together with the recess 23d. The sensors 30a to 30d and recesses 23a to 23d are disposed along the respective sides that the inner surface 22SI of the second casing 22 has.

The recesses 23c and 23d, the sensors 30c and 30d, and the back plates 24c and 24d individually have similar configurations as the recess 23a, the sensor 30a, and the back plate 24a described in the first embodiment.

2.3 Operations of Electrical Apparatus

Figure 15:
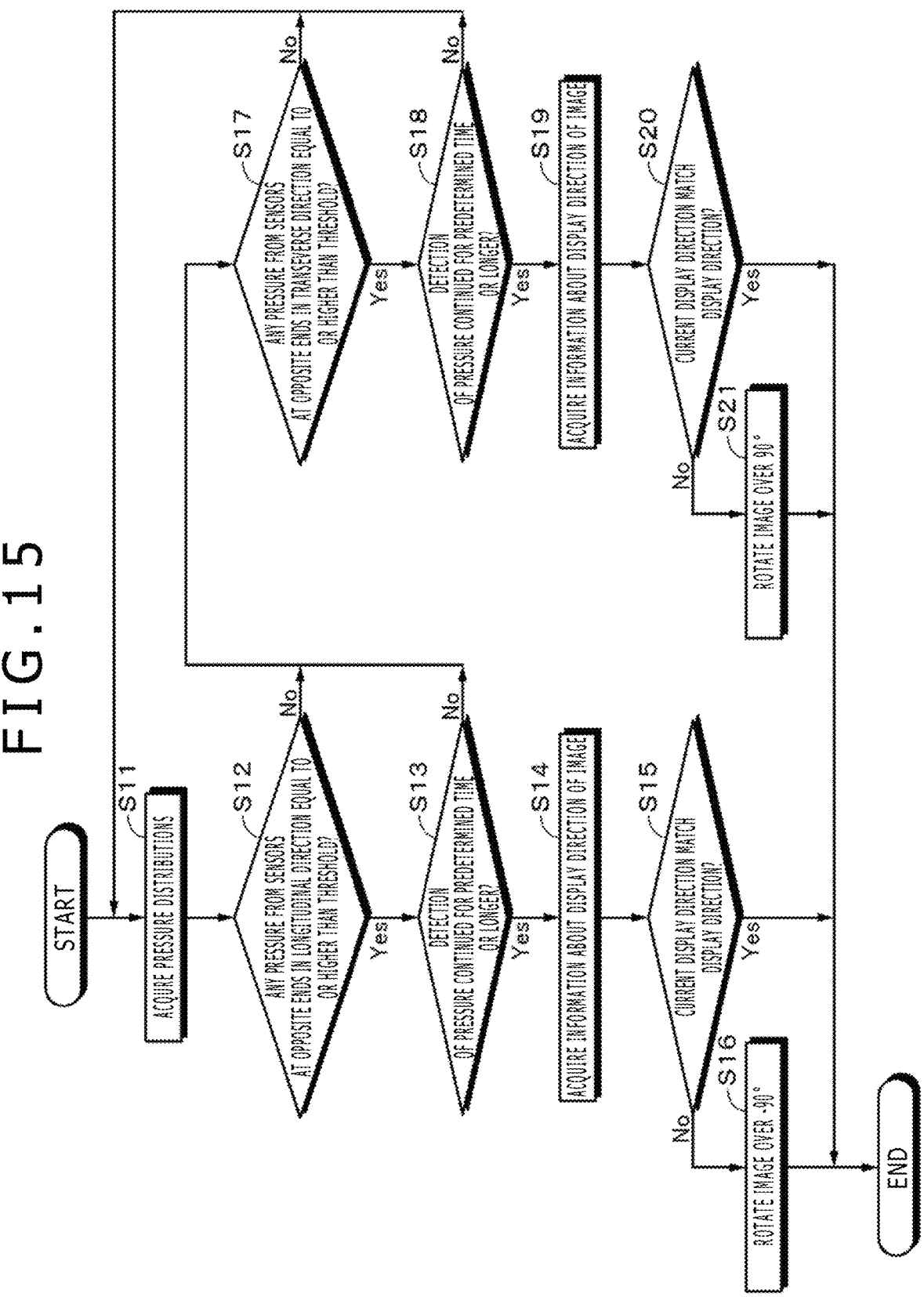
FIG. 15 is a flow chart illustrating examples of operations of an electrical apparatus according to the second embodiment of the present technology.
Figure 16:
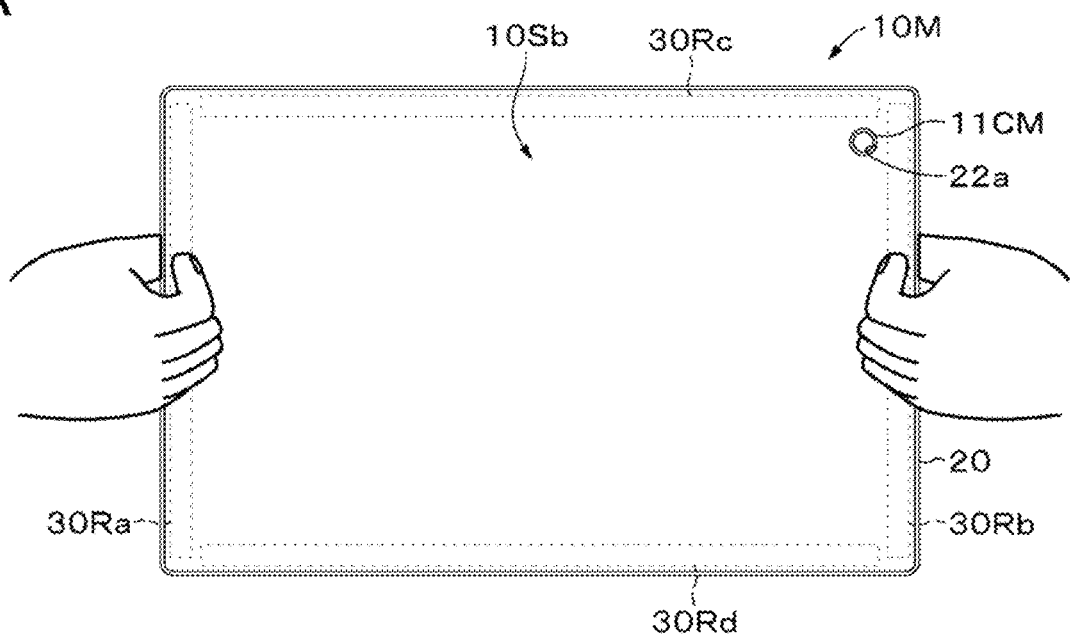
FIGS. 16A and 16B are schematic views for describing the one example of the operation of the electrical apparatus according to the second embodiment of the present technology.
Figure 16:
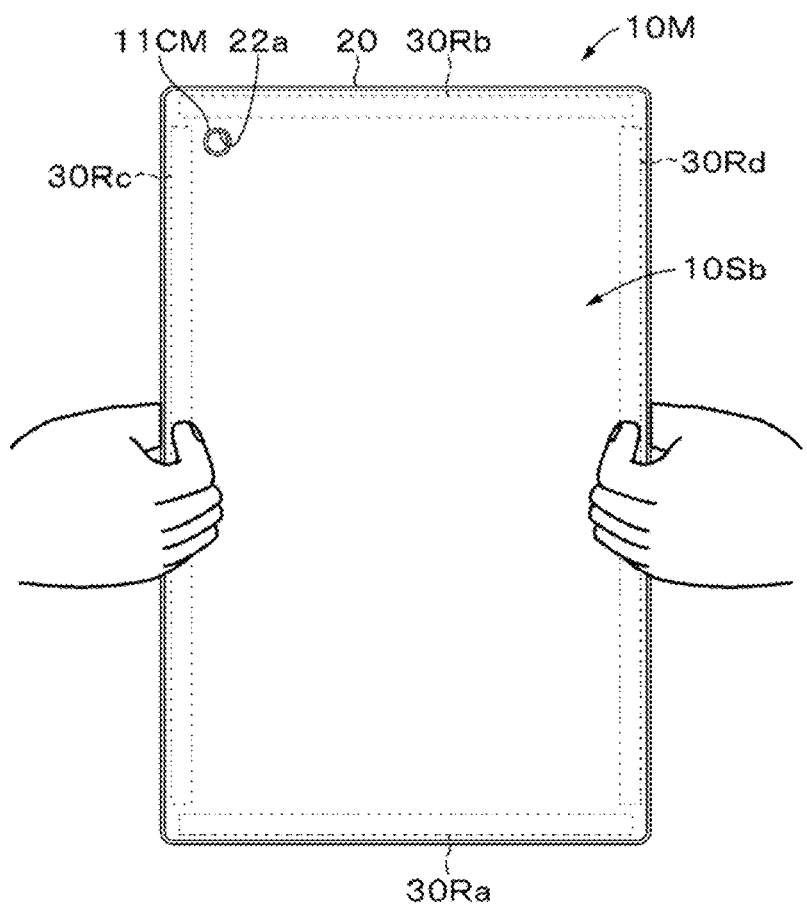

Referring to FIGS. 15, 16A, and 16B, a description will hereinafter be made about examples of operations of the electrical apparatus 10M according to the second embodiment of the present technology. Now, the host processor 11 is assumed to include a storage unit that stores information about the display direction of an image. Here, the image may be either a still image or a moving image. Processing at the host processor 11, which will be described below, is performed, specifically by the control unit included in the host processor 11.

In step S11, the host processor 11 as a main unit of the electrical apparatus 10M first acquires pressure distributions from the sensors 30a, 30b, 30c, and 30d via the controller ICs 12a, 12b, and the like. In step S12, the host processor 11 then determines, on the basis of the pressure distributions acquired in step S11, whether or not a pressure of a threshold or higher is being applied to the sensor 30a or 30b via the sensing area 30Ra or 30Rb disposed at the longitudinally opposite ends of the back surface 10Sb as illustrated in FIG. 16A.

If it is determined in step S12 that the pressure of the threshold or higher is being applied to the sensor 30a or 30b, the host processor 11 determines in step S13 whether or not the detection of the pressure of the threshold or higher at the sensor 30a or 30b has continued for a predetermined time or longer. If it is determined in step S12 that the pressure of the threshold or higher is not being applied to the sensor 30a or 30b, on the other hand, the host processor 11 advances the processing to step S17.

If it is determined in step S13 that the detection of the pressure of the threshold or higher has continued for the predetermined time or longer, the host processor 11 in step S14 acquires information about the display direction of an image from the storage unit. If it is determined in step S13 that the detection of the pressure of the threshold or higher has not continued for the predetermined time or longer, on the other hand, the host processor 11 advances the processing to step S17.

In step S15, the host processor 11 determines, on the basis of the acquired information about the display direction of the image, whether or not the current display direction of image matches. If the current display direction of image is determined to match in step S15, the processing is ended. If the current display direction of image is determined not to match in step S15, on the other hand, the host processor 11 in step S16 rotates the image, for example, over −90 degrees to make the display direction of the image match.

In step S17, the host processor 11 then determines, on the basis of the pressure distributions acquired in step S11, whether or not a pressure of the threshold or higher is being applied to the sensor 30c or 30d via the sensing area 30Rc or 30Rd disposed at the transversely opposite ends of the back surface 10Sb as illustrated in FIG. 16B.

If it is determined in step S17 that the pressure of the threshold or higher is being applied to the sensor 30c or 30d, the host processor 11 determines in step S18 whether or not the detection of the pressure of the threshold or higher at the sensor 30c or 30d has continued for the predetermined time or longer. If it is determined in step S17 that the pressure of the threshold or higher is not being applied to the sensor 30c or 30d, on the other hand, the host processor 11 returns the processing to step S11.

If it is determined in step S18 that the detection of the pressure of the threshold or higher has continued for the predetermined time or longer, the host processor 11 in step S19 acquires the information about the display direction of the image from the storage unit. If it is determined in step S18 that the detection of the pressure of the threshold or higher has not continued for the predetermined time or longer, on the other hand, the host processor 11 returns the processing to step S11.

In step S20, the host processor 11 determines on the basis of the acquired information about the display direction of the image, whether or not the current display direction of image matches. If the current display direction of image is determined to match in step S20, the processing is ended. If the current display direction of image is determined not to match in step S20, on the other hand, the host processor 11 in step S21 rotates the image, for example, over 90 degrees to make the display direction of the image match.

2.4 Effects

The electrical apparatus 10M according to the second embodiment can correct the display direction of an image by determining which one of the four sides of the back surface 10Sb the user is holding. The direction of the screen can, therefore, be controlled to match the direction of the user even if the user uses the electrical apparatus 10M while lying down. Further, the electrical apparatus 10M may be configured to exhibit a particular function only when the user is holding a specific side portion of the back surface 10Sb.

3. Third Embodiment

3.1 Configuration of Sensing Areas

Figure 17:
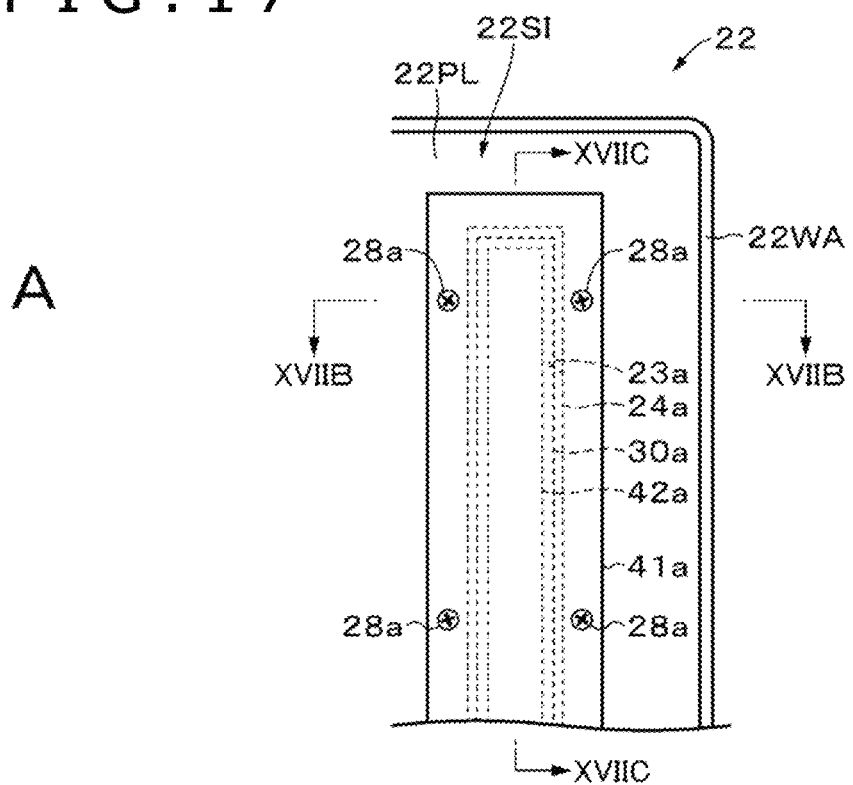
FIG. 17A is a plan view illustrating one example of a configuration of a sensing area in a third embodiment of the present technology.
FIG. 17B is a cross-sectional view taken along line XVIIB-XVIIB of FIG. 17A.
FIG. 17C is a cross-sectional view taken along line XVIIC-XVIIC of FIG. 17A.
Figure 17:
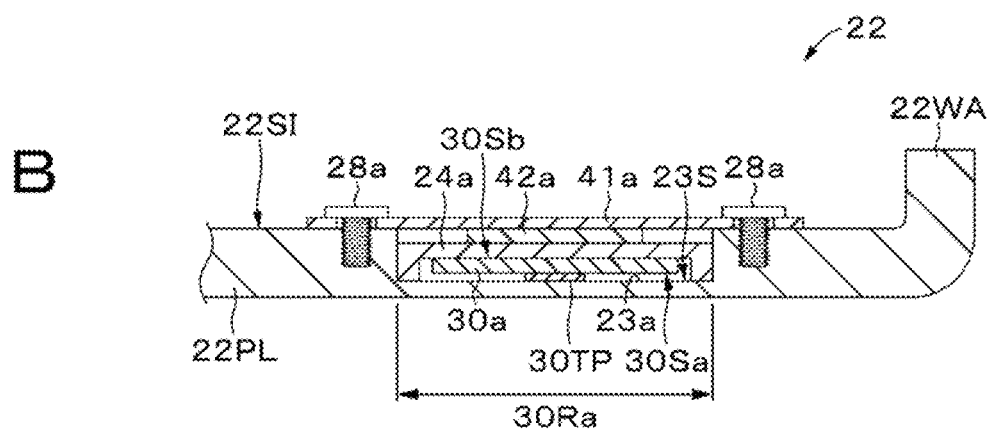
Figure 17:
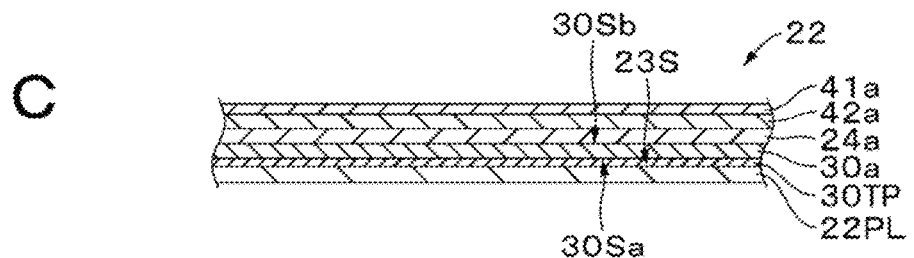

As illustrated in FIGS. 17A to 17C, the sensor 30a, the back plate 24a, and an elastic layer 42a are accommodated in the recess 23a, and the recess 23a with these members accommodated therein is covered in its entirety by a spring plate 41a. The back plate 24a is disposed on the side of the back surface 30Sb of the sensor 30a, and the elastic layer 42a is disposed between the back plate 24a and the spring plate 41a. The spring plate 41a is fixed to the inner surface 22SI of the second casing 22 by plural screw members 28a.

Although the example that the back plate 24a is fixed by the single spring plate 41a is illustrated in FIG. 17A, the back plate 24a may be fixed by plural spring plates 41a.

Figure 18:
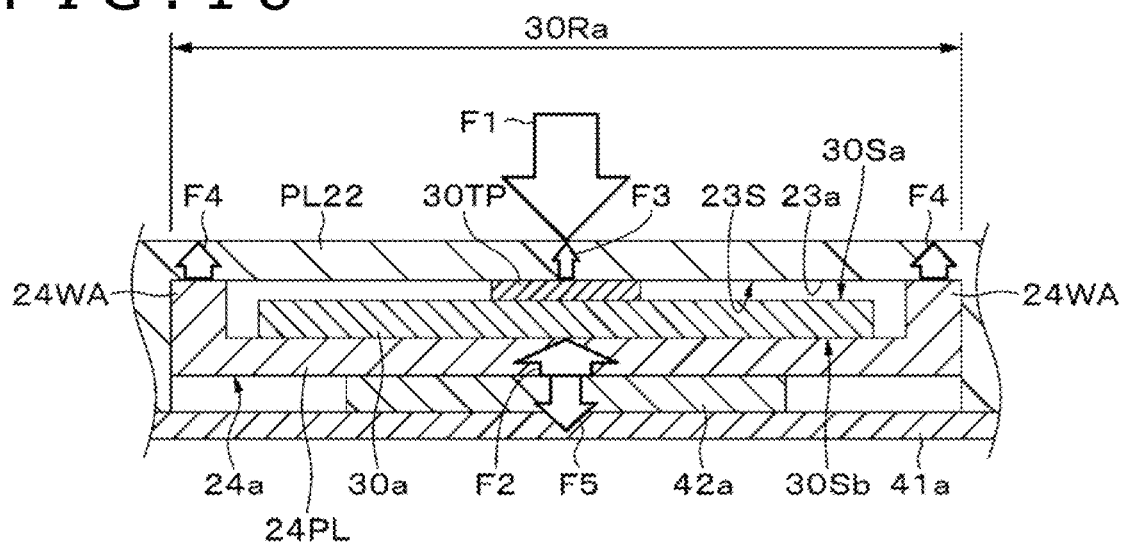
FIG. 18 is a cross-sectional view for describing about examples of functions of individual members that make up the sensing area.

As illustrated in FIG. 18, the back plate 24a includes a main surface section 24PL, and wall portions 24WA and 24WA disposed at opposite ends of the main surface section 24PL. With the back plate 24a being fitted in the recess 23a, the sensor 30a is placed between the wall portions 24WA and 24WA, and the rear surface 30Sb of the sensor 30a is covered by the main surface section 24PL.

The spring plate 41a is a fixing member, which fixes the back plate 24a in the recess 23a in such a way that the main surface section 24PL of the back plate 24a is pressed against the back surface 30Sb of the sensor 30 via the elastic layer 42a. As an alternative, the back plate 24a may be fixed in the recess 23a in such a way that the wall portions 24WA and 24WA of the back plate 24a are pressed at free ends thereof against the bottom surface 23S of the recess 23a via the elastic layer 42a.

The spring plate 41a can use, for example, polymer resin or metal. As the polymer resin, those which are similar to the polymer resins of the substrates 31a and 35a in the first embodiment can be exemplified. As the metal, those which are similar to the metal of the casing 20 in the first embodiment can be exemplified.

The elastic layer 42a is formed, for example, of a rubber such as foamed urethane. A pressure-sensitive adhesive layer may be disposed on at least one side of the elastic layer 42a. The elastic layer 42a has a sheet form, for example, but shall not be limited to such a form.

In the third embodiment, the configurations other than those described above can be similar to the first embodiment or its modification or modifications, or similar to the second embodiment or its modification or modifications. Further, the sensing areas 30Rb, 30Rc, and 30Rd may adopt a similar configuration as the sensing area 30Ra described above.

3.2 Functions of Individual Members of Sensing Areas

With reference to FIG. 18, a description will hereinafter be made about examples of functions of the individual members that make up the sensing areas. If a force F1 is applied to the sensing area 30Ra disposed on the surface of the second casing 22, the bottom surface 23S of the recess 23a is slightly deformed. By this deformation, the sensing surface 30Sa of the sensor 30a is pressed, and an electrostatic capacitance distribution, in other words, a pressure distribution is detected by the sensor 30a.

The back plate 24a is pressing the sensing surface 30Sa of the sensor 30a under a force F3 against the bottom surface 23S of the recess 23a. It is, therefore, possible to restrain the sensor 30a from finding a way downward in FIG. 18 (in a direction away from and perpendicular to the bottom surface 23S) and to allow the sensing surface 30Sa (namely, the REF electrode layer 35; see FIG. 8) to follow deformations of the bottom surface 23S of the recess 23a. As the sensing surface 30Sa of the sensor 30a has flexibility, it is possible to restrain the sensor 30a from interfering with deformations of the bottom surface 23S of the recess 23a. The back plate 24a fixes the back surface 30Sb of the sensor 30a, and therefore, the back surface 30Sb (namely, the REF electrode layer 31; see FIG. 8) of the sensor 30a is restrained from deformation.

The spring plate 41a presses the back surface of the main surface section 24PL of the back plate 24a under a force F2 via the elastic layer 42a so that the back plate 24a is fixed. The back plate 24a can, therefore, be restrained from deformation and/or dislocation if the sensing surface 30Sa of the sensor 30a is pressed via the bottom surface 23S of the recess 23a. A force F5 can, hence, be restrained from finding a way downward in FIG. 18 from the side of the back surface 30Sb of the sensor 30a.

Between the back surface of the main surface section 24PL of the back plate 24a and the surface of the spring plate 41a, the elastic layer 42a is disposed. Hence, to such an extent as avoiding interference with deformation of the bottom surface 23S of the recess 23a, it is possible to press the sensing surface 30Sa of the sensor 30a under the force F3 against the bottom surface 23S of the recess 23a via the back plate 24a and also to press the wall portions 23WA and 23WA of the back plate 24a under a force F4 against the bottom surface 23S of the recess 23a.

An excellent sensitivity can be obtained because the individual members of the sensing area 30Ra have such functions as described above.

3.3 Effects

In the third embodiment, the spring plate 41a fixes the back plate 24a in such a way as to press the back plate 24a against the bottom surface 23S of the recess 23a via the elastic layer 42a. The sensing surface 30Sa of the sensor 30a can, therefore, be pressed against the bottom surface 23S of the recess 23a while holding the sensor 30a by the back plate 24a in a state that the sensor 30a is movable to such an extent as avoiding interference with deformation of the bottom surface 23S. Consequently, the sensing area 30Ra is further improved in characteristics such as sensitivity.

3.4 Modifications

In the third embodiment described above, the description was made about the configuration that the spring plate 41a is fixed on the inner surface 22SI of the second casing 22 by the screw members 28a. However, the configuration to fix the spring plate 41a shall not be limited to the above-described one.

Figure 19:
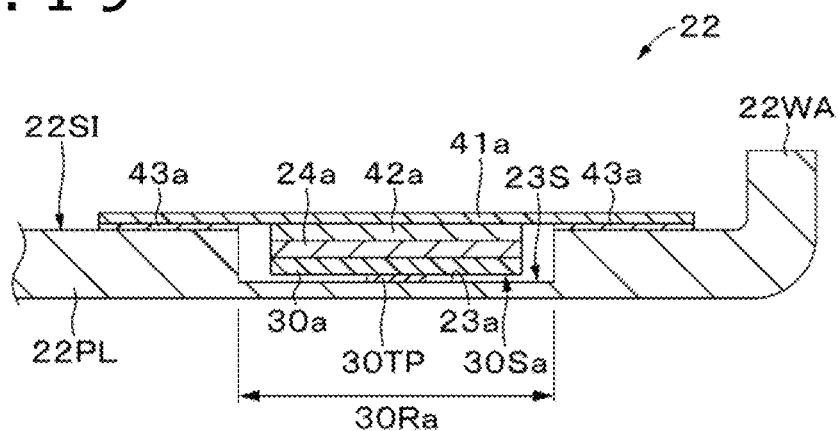
FIGS. 19A to 19C are cross-sectional views illustrating configuration examples of a sensing area in a modification of the third embodiment of the present technology.
Figure 19:
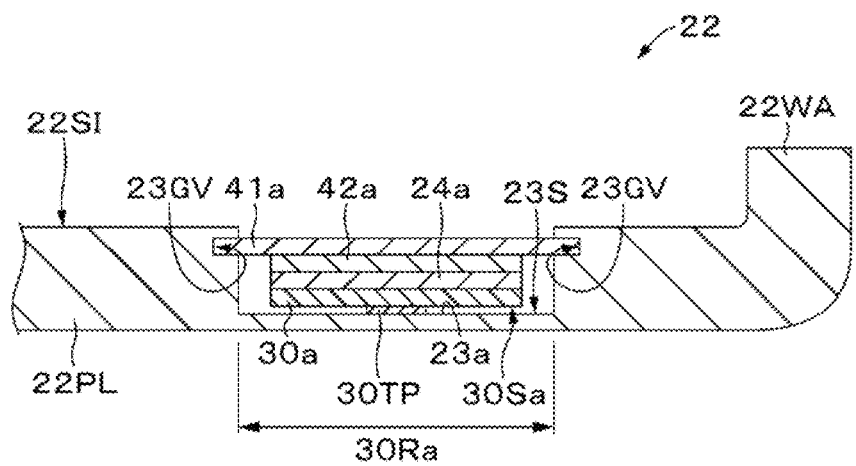
Figure 19:
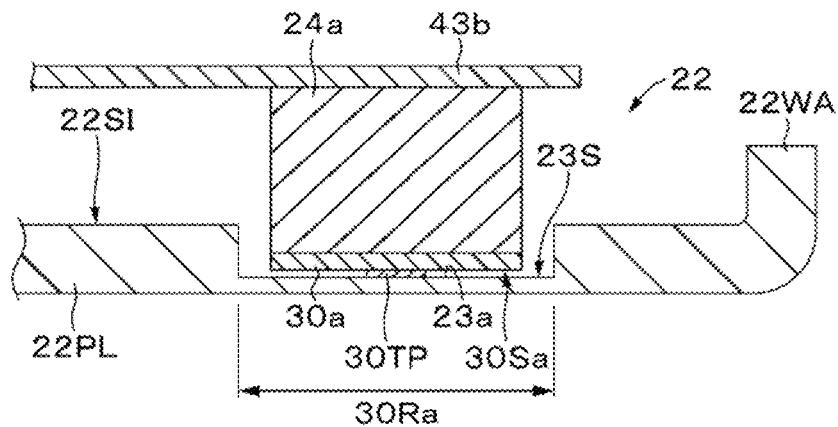

As illustrated in FIG. 19A, for example, the spring plate 41a may be bonded with the inner surface 22SI of the second casing 22 by an adhesion layer 43a. The adhesion layer 43a is similar, for example, to the adhesion layer 33c in the first embodiment. As illustrated in FIG. 19A, the back plate 24a may have a plate shape.

Further, as illustrated in FIG. 19B, slots 23GV may be provided in opposite side walls of the recess 23a to fit the plate-shaped spring plate 41a at its opposite ends in the slots 23GV. In this modification, at least one of the back plate 24a and the elastic layer 42a may be disposed as needed between the sensor 30a and the back plate 24a.

Furthermore, as illustrated in FIG. 19C, the back plate 24a may be fixed on a support plate 43b. As the support plate 43b, a member such as a panel or substrate accommodated in the casing 20, the first casing 21 forming the casing 20, or the like can be mentioned, for example.

4. Fourth Embodiment

4.1 Configuration of Sensing Areas

Figure 20:
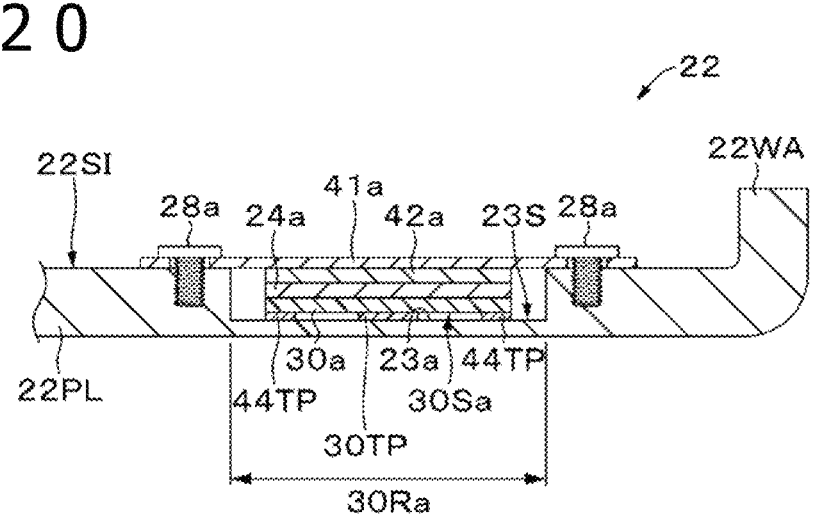
FIG. 20A is a cross-sectional view illustrating one example of a configuration of a sensing area in a fourth embodiment of the present technology.
FIG. 20B is a plan view illustrating one example of a configuration of a sensor.
FIG. 20C is a cross-sectional view taken along line XXC-XXC of FIG. 20B.
Figure 20:
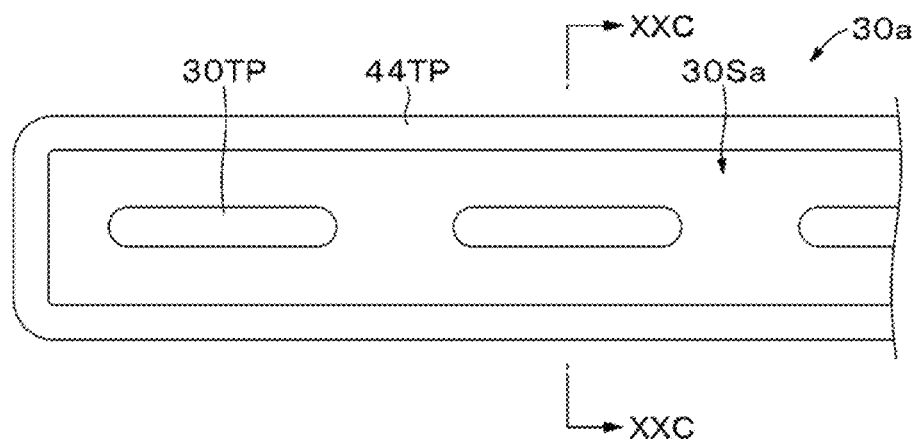
Figure 20:
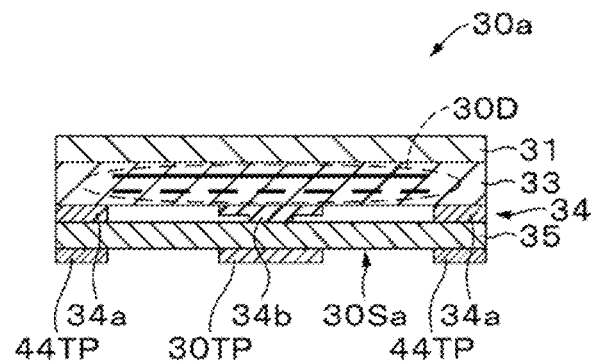

As illustrated in FIG. 20A, plural raised portions 30TP and a single raised part 44TP are disposed on at least one of the sensing surface 30Sa of the sensor 30a and the bottom surface 23S of the recess 23a.

If the raised portions 30TP and the single raised part 44TP are disposed on the sensing surface 30Sa of the sensor 30a, the raised portions 30TP and the single raised part 44TP are pressed at their tops against and in contact with the bottom surface 23S of the recess 23a. If the raised portions 30TP and the single raised part 44TP are disposed on the bottom surface 23S of the recess 23a, on the other hand, the raised portions 30TP and the single raised part 44TP are pressed at their tops against and in contact with the sensing surface 30Sa of the sensor 30a.

Referring to FIGS. 20B and 20C, a description will hereinafter be made about a configuration that the plural raised portions 30TP and a single raised part 44TP are disposed on the sensing surface 30Sa of the sensor 30a.

The raised portions 30TP disposed on the sensing surface 30Sa are one example of the structure portions, and are linearly disposed, at a middle position in the transverse direction (width direction) of the elongated sensing surface 30Sa, at predetermined intervals in the longitudinal direction of the elongated sensing surface 30Sa. The single raised part 44TP disposed on the sensing surface 30Sa is an example of the one peripheral edge structure part, and is disposed continuously along the peripheral edge of the sensing surface 30Sa of the sensor 30a.

The raised portions 30TP disposed at the middle part in the transverse direction of the sensing surface 30Sa may preferably have higher rigidity than the REF electrode layer 35. Described specifically, the raised portions 30TP disposed at the middle part in the transverse direction of the sensing surface 30Sa may preferably have a higher Young's modulus than the REF electrode layer 35, because the longitudinal deformation of the sensing surface 30Sa is promoted and the sensing area 30Ra is improved further in characteristics such as sensitivity.

In the fourth embodiment, the configurations other than those described above can be similar to the third embodiment or its modification or modifications. Further, the sensing areas 30Rb, 30Rc, and 30Rd may adopt a similar configuration as the sensing area 30Ra described above.

4.2 Effects

In the fourth embodiment, the raised portions 30TP and the single raised part 44TP are disposed on at least one of the sensing surface 30Sa of the sensor 30a and the bottom surface 23S of the recess 23a. The elongated sensing surface 30Sa can, therefore, be supported at the three locations of its transversely opposite end parts and middle part in the recess 23a of the casing 22. Accordingly, the sensing surface 30Sa (namely, the REF electrode layer 35) is allowed to stably follow deformation of the bottom surface 23S of the recess 23a. Consequently, the sensing area 30Ra is further improved in characteristics such as sensitivity.

If the sensing surface 30Sa of the sensor 30a includes the raised portions 30TP and the raised part 44TP, the formation of the sensing area 30Ra is easy compared with the configuration that the bottom surface 23S of the recess 23a includes the raised portions 30TP and the raised part 44TP.

4.3 Modifications

In the fourth embodiment, the description was made taking, as an example, the configuration that the raised portions 30TP and the single raised part 44TP are disposed on at least one of the sensing surface 30Sa of the sensor 30a and the bottom surface 23S of the recess 23a. However, the configuration of the sensing area 30Ra shall not be limited to the above-described configuration. It is possible to adopt the configuration that one or more raised portions 30TP and one or more raised parts 44TP are disposed on at least one of the sensing surface 30Sa of the sensor 30a and the bottom surface 23S of the recess 23a.

Figure 21:
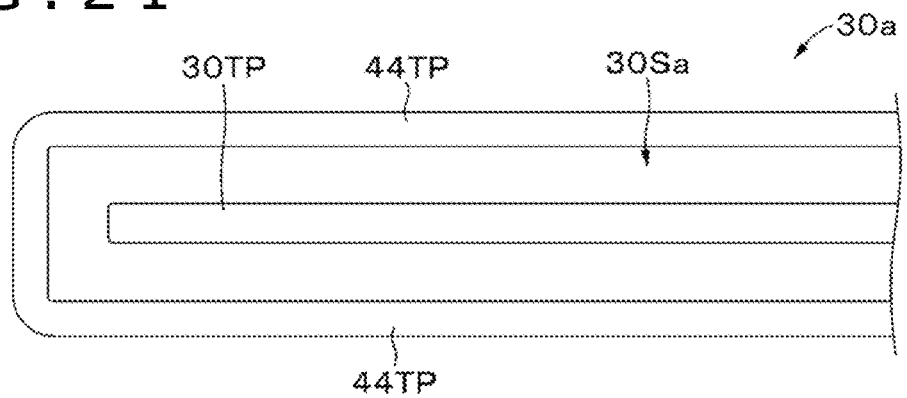
FIGS. 21A to 21D are plan views illustrating examples of a configuration of a sensing surface in a modification of the fourth embodiment of the present technology.
Figure 21:
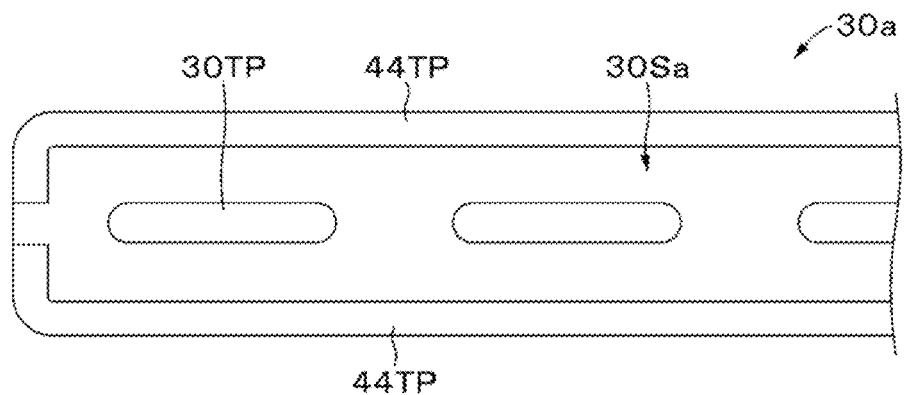
Figure 21:
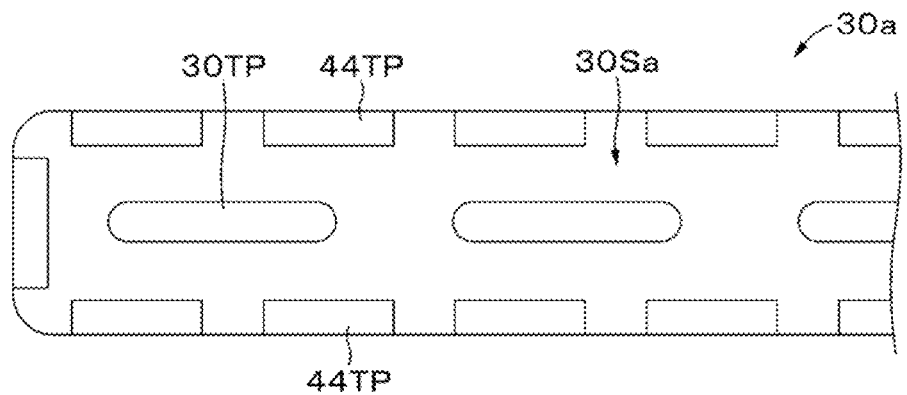
Figure 21:
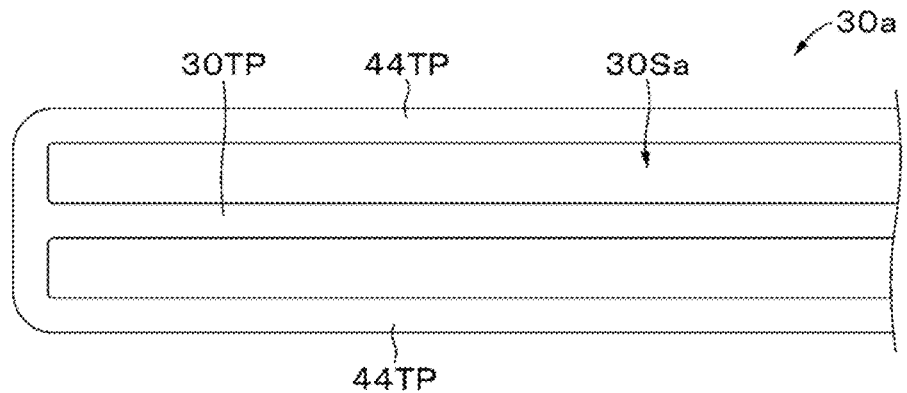

Described specifically, such a configuration as will be described below may also be adopted. As illustrated in FIG. 21A, a single raised portion 30TP may be disposed at a middle position in the transverse direction (width direction) of the sensing surface 30Sa, and may be disposed extending in the longitudinal direction of the sensing surface 30Sa.

As illustrated in FIG. 21B, two raised parts 44TP and 44TP may be disposed extending along the two long sides individually of the elongated sensing surface 30Sa. In this modification, as illustrated in FIG. 21B, opposite ends of the raised parts 44TP and 44TP as viewed in the directions of their extended disposition may be disposed extending to neighborhoods of middle parts of the short sides of the elongated sensing surface 30Sa as needed.

As illustrated in FIG. 21C, plural raised parts 44TP may be disposed at predetermined intervals along the peripheral edge of the sensing surface 30Sa. In FIG. 21C, the description is made about the example that plural raised portions 30TP are linearly disposed at predetermined intervals in the longitudinal direction of the sensing surface 30Sa. However, a single raised portion 30TP may be disposed extending in the longitudinal direction of the sensing surface 30Sa.

As illustrated in FIG. 21D, a single raised portion 30TP and a single raised part 44TP may be integrally joined together to configure a single raised part.

Figure 22:
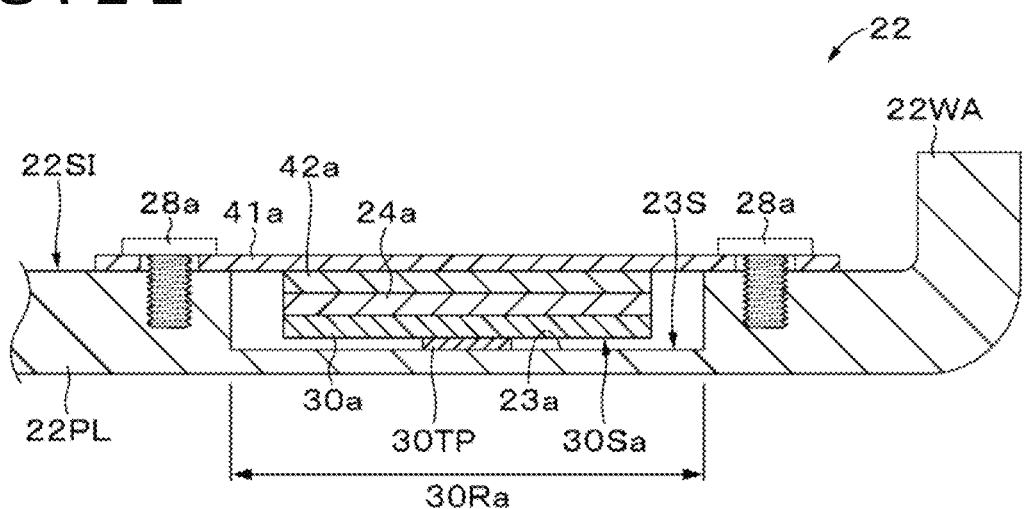
FIG. 22A is a cross-sectional view illustrating one example of a configuration of a sensing area in another modification of the fourth embodiment of the present technology.
FIG. 22B is a cross-sectional view illustrating an example of a configuration of a sensor in another modification of the fourth embodiment of the present technology.
Figure 22:
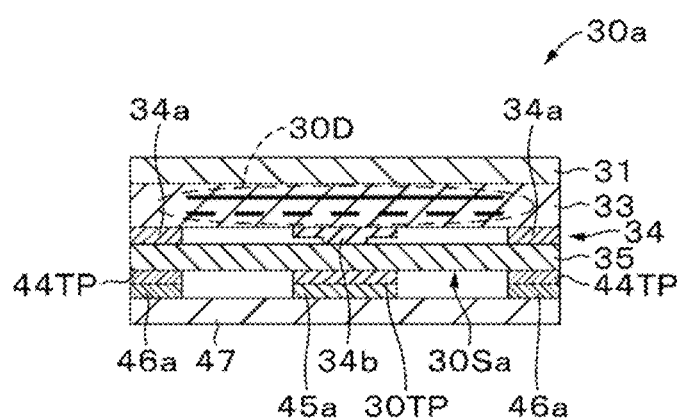

As illustrated in FIG. 22A, in the fourth embodiment, it may be possible to adopt a configuration that no raised part 44TP is disposed along the peripheral edge of at least one of the sensing surface 30Sa of the sensor 30a and the bottom surface 23S of the recess 23a. However, the configuration that the raised part or parts 44TP are disposed to fix the peripheral edge of the sensor 30a leads to stabler detection operations at the sensing area 30Ra.

If the sensor 30a adopts a configuration that one or more raised portions 30TP and one or more raised parts 44TP are disposed on the sensing surface 30Sa, the sensor 30a, in a state before its disposition in the recess 23a, may have such a configuration as will be described next. Described specifically, as illustrated in FIG. 22B, the sensor 30a may be configured to further include a pressure-sensitive adhesion layer 45a disposed on the raised portion 30TP, one or more pressure-sensitive adhesion layer 46a disposed on the raised part or parts 44TP, and a release layer 47 such as a release sheet disposed on the pressure-sensitive adhesion layers 45a and 46a. This configuration makes it possible to easily fix the sensor 30a at a predetermined position on the bottom surface 23S of the recess 23a by simply removing the release layer 47 and disposing the sensor 30a in the recess 23a.

Instead of the configuration that the one or more raised portions 30TP as structure portions and the one or more raised parts 44TP as peripheral edge structure parts are disposed on at least one of the sensing surface 30Sa of the sensor 30a and the bottom surface 23S of the recess 23a, the following configuration may be adopted. Described specifically, a structure layer, which includes such structure portion or portions and such peripheral edge structure part or parts, may be disposed, as a member discrete from the sensing surface 30Sa and the bottom surface 23S, between the sensing surface 30Sa and the bottom surface 23S.

5. Fifth Embodiment

5.1 Configuration of Sensors

Figure 23:
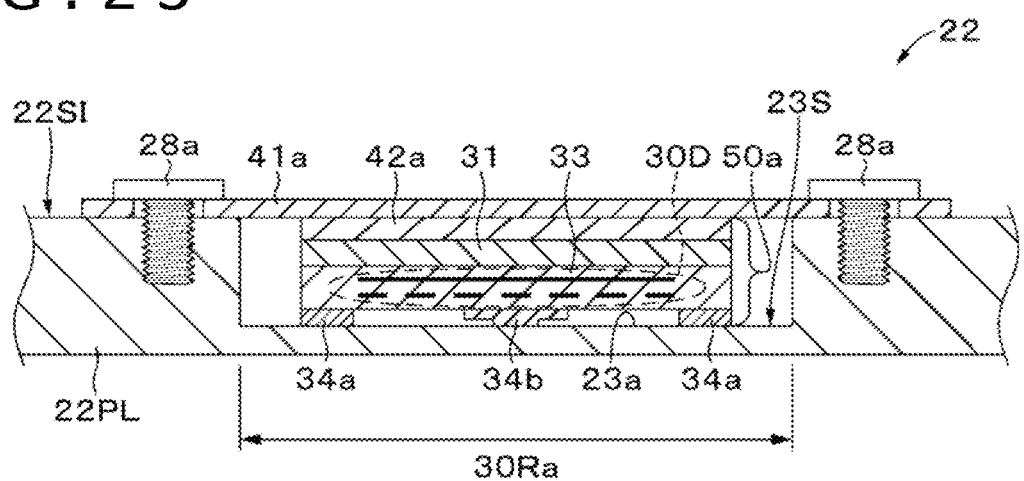
FIG. 23A is a cross-sectional view illustrating one example of a configuration of a sensing area in a fifth embodiment of the present technology.
FIG. 23B is a cross-sectional view illustrating an example of a configuration of a sensor.
Figure 23:
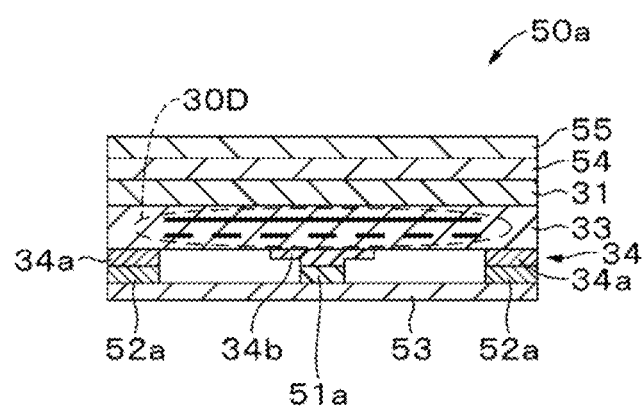

As illustrated in FIG. 23A, a sensor 50a in a fifth embodiment of the present technology is different from the sensor 30a in the fourth embodiment in that the sensor 50a has the following configuration. Described specifically, the sensor 50a in the fifth embodiment does not include the REF electrode layer 35 (see FIG. 20C) as a conductive layer, and has a configuration that the sensor 50a is fixed in the recess 23a with the frame 34a and the structure portions 34b being in contact at their tops with the bottom surface 23S of the recess 23a.

In the fifth embodiment, the part of the bottom surface 23S of the recess 23a functions as the REF electrode layer (conductive layer) 35. At least the part of the bottom surface 23S of the recess 23a in the second casing 22 has conductivity accordingly. Described specifically, for example, the second casing 22 may have conductivity as a whole or at the inner surface 22SI thereof, or the second casing 22 may have conductivity only at an inner side surface or the bottom surface 23S of the recess 23a.

In the configuration that the inner surface 22SI of the second casing 22 has conductivity, a conductive layer is disposed over the inner surface 22SI. In the configuration that the second casing 22 has conductivity only at the inner side surface or the bottom surface 23S of the recess 23a, a conductive layer is disposed on the inner side surface or the bottom surface 23S of the recess 23a. These conductive layers can be, for example, plating layers, vapor deposition layers, sputtered layers, metal foils, conductive layers obtained by drying and curing a conductive paste or the like.

5.2 Effects

In the fifth embodiment, the part of the bottom surface 23S of the recess 23a of the second casing 22 functions as the REF electrode layer 35, and therefore, the sensor 50a can be provided with a simpler and thinner configuration.

5.3 Modifications

In the state before the disposition of the sensor 50a in the recess 23a, the sensor 50a may have such a configuration as will be described next. Described specifically, as illustrated in FIG. 23B, the sensor 50a may further include a pressure-sensitive adhesion layer 51a disposed on the structure part 34b, another pressure-sensitive adhesion layer 52a disposed on the structure part 34b, and a release layer 53, such as a release sheet, disposed on the pressure-sensitive adhesion layers 51a and 52a. This configuration makes it possible to easily fix the sensor 50a at a predetermined position on the bottom surface 23S of the recess 23a by simply removing the release layer 53 and disposing the sensor 50a in the recess 23a.

As illustrated in FIG. 23B, the sensor 50a may further include, as needed, a pressure-sensitive adhesion layer 54 disposed on the back surface of the REF electrode layer 31, and a release layer 55, such as a release sheet, disposed on the pressure-sensitive adhesion layer 54.

6. Sixth Embodiment

6.1 Configuration of Sensors

Figure 24:
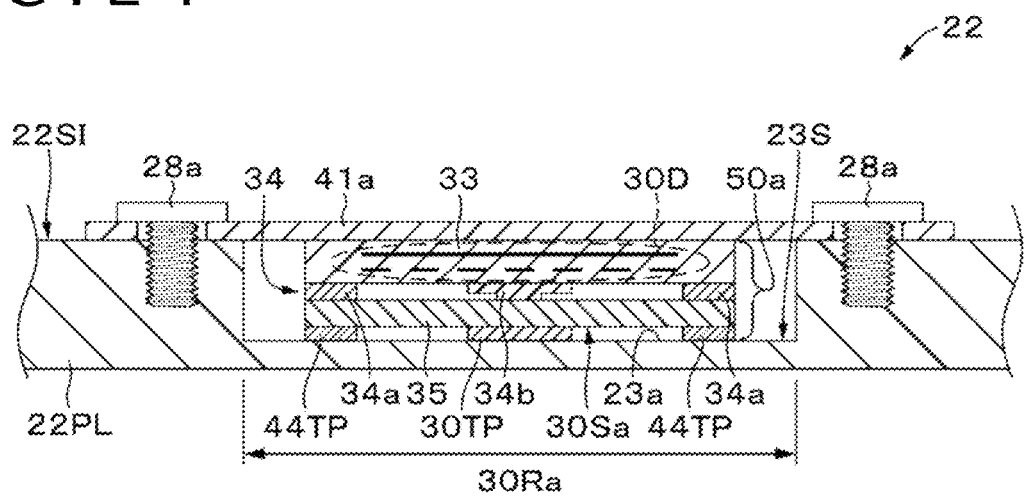
FIG. 24A is a cross-sectional view illustrating one example of a configuration of a sensing area in a sixth embodiment of the present technology.
FIG. 24B is a cross-sectional view illustrating a configuration example of a sensing area in a modification of the sixth embodiment of the present technology.
Figure 24:
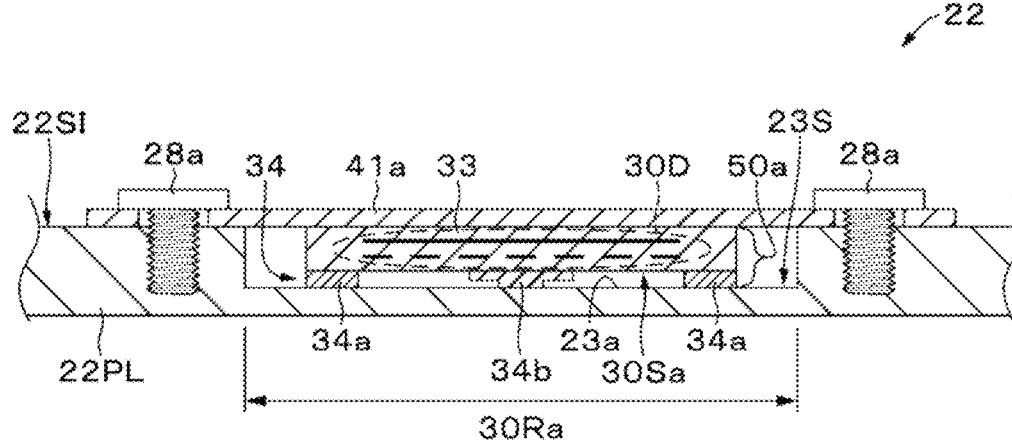

As illustrated in FIG. 24A, a sensor 50a in a sixth embodiment of the present technology is different from the sensor 30a in the fourth embodiment in that the sensor 50a has the following configuration. Described specifically, the sensor 50a in the sixth embodiment does not include the REF electrode layer 31 (see FIG. 20C) as a conductive layer, and has a configuration that the back surface of the sensor layer 33 and the surface of the spring plate 41a are in contact with each other.

In the sixth embodiment, a spring plate 41a functions as the REF electrode (conductive layer) 31. Thus, at least a surface of the spring plate 41a, the surface being in contact with the sensor layer 33, has conductivity accordingly. Described specifically, for example, the spring plate 41a may have conductivity as a whole or only at the surface where the spring plate 41a is in contact with the sensor layer 33.

In the configuration that the spring plate 41a has conductivity as a whole, the spring plate 41a contains a conductive material. In the configuration that the spring plate 41a has conductivity only at the surface where the spring plate 41a is in contact with the sensor layer 33, a conductive layer is disposed on the surface of the spring plate 41a, the surface being in contact with the sensor layer 33. The conductive layer can be, for example, a plating layer, vapor deposition layer, sputtered layer, metal foil, a conductive layer obtained by drying and curing a conductive paste or the like.

6.2 Effects

In the sixth embodiment, the spring plate 41a functions as the REF electrode layer 31, and therefore, the sensor 50a can be provided with a simpler and thinner configuration.

6.3 Modifications

As illustrated in FIG. 24B, the sensor 50a may exclude the REF electrode layer 35 as a conductive layer, and may be fixed in the recess 23a with the frame 34a and structure portions 34b being in contact at their tops with the bottom surface 23S of the recess 23a.

7. Seventh Embodiment

7.1 Configuration of Sensing Areas

Figure 25:
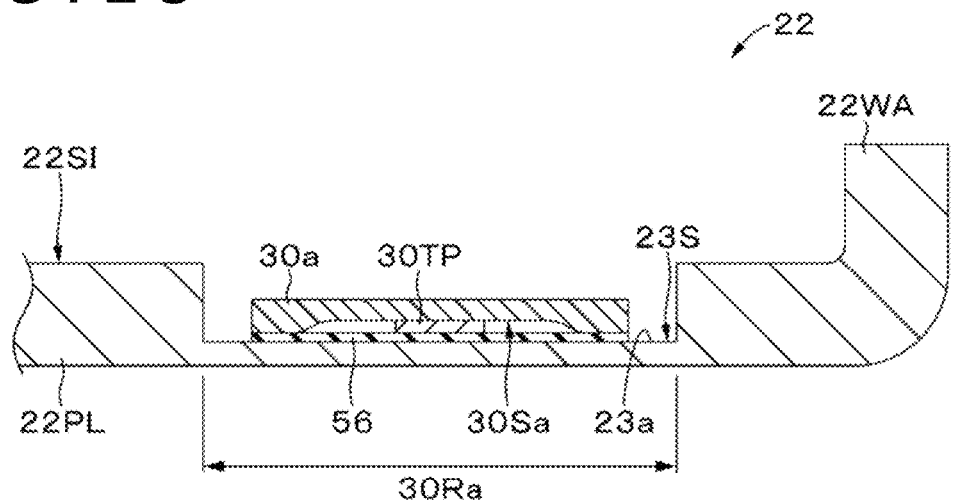
FIG. 25A is a cross-sectional view illustrating one example of a configuration of a sensing area in a seventh embodiment of the present technology.
FIGS. 25B and 25C are cross-sectional views illustrating configuration examples of sensing areas in modifications of the seventh embodiment of the present technology.
Figure 25:
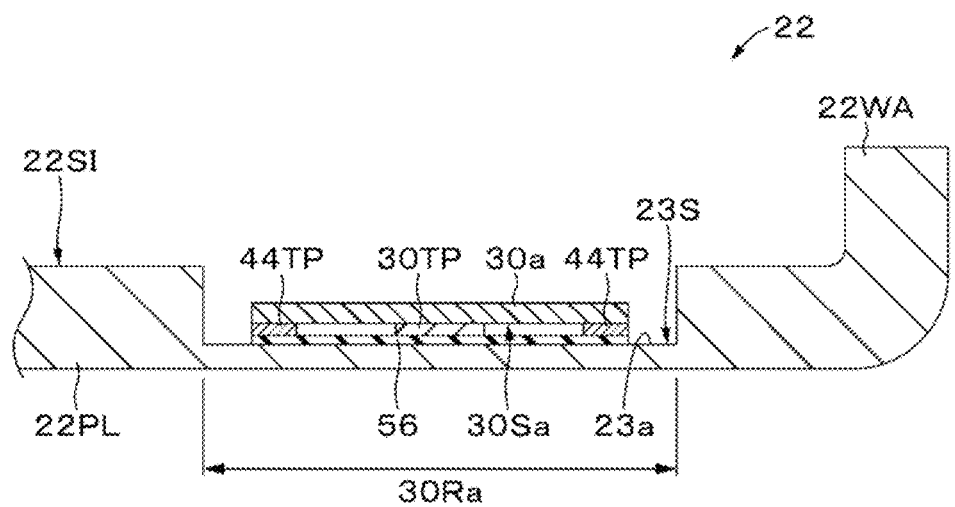
Figure 25:
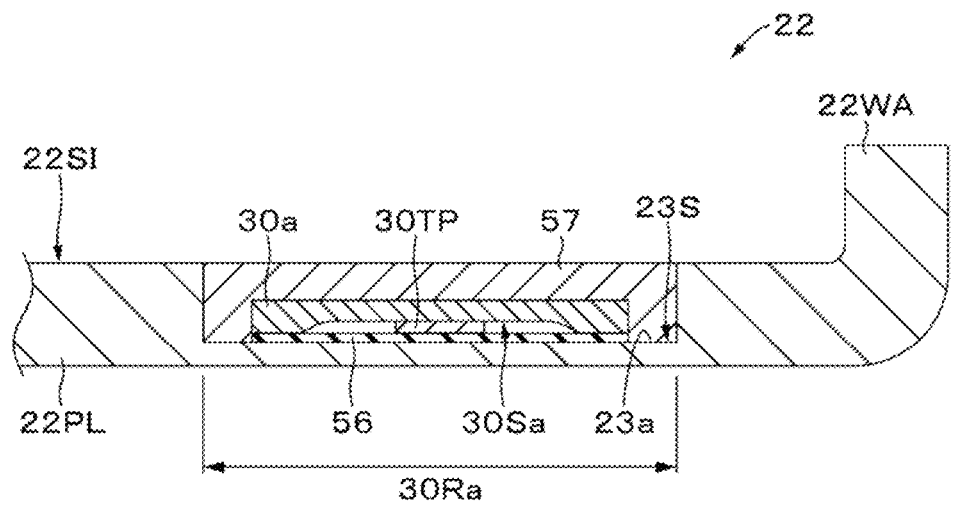

As illustrated in FIG. 25A, an adhesion layer 56 is disposed between a sensing surface 30Sa of a sensor 30a and the bottom surface 23S of the recess 23a, and the sensing surface 30Sa and the bottom surface 23S are bonded together via the adhesion layer 56. The adhesion layer 56 is similar to the adhesion layer 33c in the first embodiment.

At a transversely middle position of the elongated sensing surface 30Sa, one or plural raised portions 30TP are disposed. These raised portions 30TP are bonded at their tops with the adhesion layer 56. As illustrated in FIG. 25A, the sensing surface 30Sa may be bonded at their transversely opposite end parts with the adhesion layer 56 as needed.

7.2 Effects

In the seventh embodiment, the sensing surface 30Sa of the sensor 30a and the bottom surface 23S of the recess 23a are bonded together via the adhesion layer 56, and therefore, the sensing area 30Ra can be improved in characteristics such as sensitivity. In addition, the sensing area 30Ra can have a simplified configuration.

7.3 Modifications

As illustrated in FIG. 25B, one or more raised portions 44TP may be further disposed on the peripheral edge of the sensing surface 30Sa of the sensor 30a. In this modification, the one or more raised portions 30TP and the one or more raised parts 44TP, which are disposed on the sensing surface 30Sa, are bonded at their tops with the adhesion layer 56.

As illustrated in FIG. 25C, the recess 23a may be filled with a cured resin composition, and the sensor 30a may be covered at its periphery with the cured resin composition to fix the sensor 30a in the recess 23a. As the resin composition, it is possible to use, for example, an energy ray-curable resin composition such as a UV-curable resin, a thermosetting resin, a hot-melt resin, or the like.

In the seventh embodiment, the description was made taking, as an example, the composition that the one or more raised portions 30TP are disposed on the sensing surface 30Sa. However, the configuration of the sensing area 30Ra is not limited to the above-described configuration. It is only necessary to dispose one or more structure portions between the sensing surface 30Sa and the adhesion layer 56. Therefore, one or more raised portions may be disposed on the surface of the adhesion layer 56.

The seventh embodiment may be configured to further include at least one of component members, such as the back plate 24a, the spring plates 27a and 41a, and the elastic layer 42a in the first to sixth embodiments and their modifications.

Figure 26:
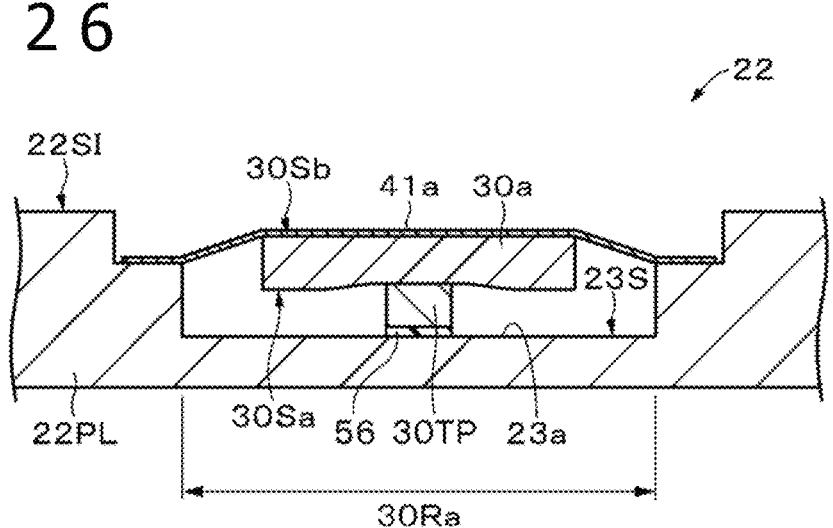
FIG. 26A is a cross-sectional view illustrating a configuration example of a sensing area in a still further modification of the seventh embodiment of the present technology.
FIG. 26B is a cross-sectional view representing a part of FIG. 26A on an enlarged scale.
Figure 26:
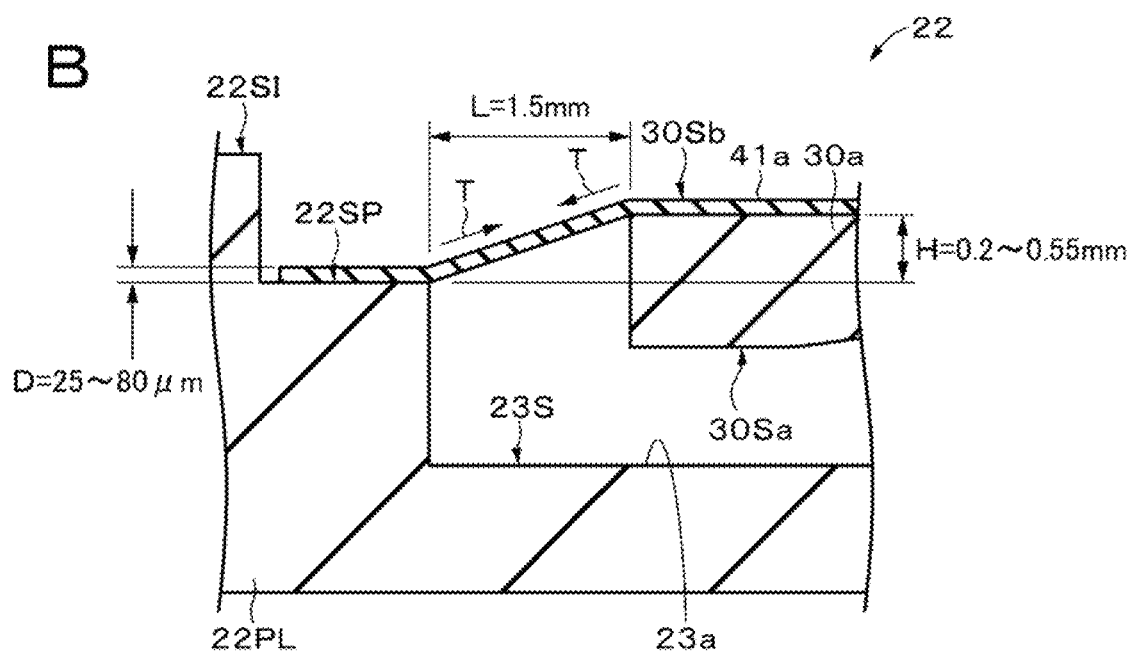

As illustrated in FIG. 26A, a spring plate 41a may be disposed further on the side of the back surface 30Sb of the sensor 30a. The spring plate 41a is pressing the back surface 30Sb of the sensor 30a toward the bottom surface 23S of the recess 23a. The spring plate 41a is fixed, at its opposite end portions in the transverse direction (widthwise direction) of the elongated sensor 30a, to opposite end parts of the recess 23a, for example, by screw members, adhesive layers, or both of them. The thickness D of the spring plate 41a may preferably be 25 to 80 μm (both inclusive) as illustrated in FIG. 26B. The space L between each end portion of the sensor 30a in the transverse direction of the sensor 30a and its opposite inner side surface of the recess 23a (hereinafter simply called the "space L") may preferably be approximately 1.5 mm as illustrated in FIG. 26B. The height H of the back surface 30Sb of the sensor 30a may preferably be 0.2 to 0.55 mm (both inclusive) as illustrated in FIG. 26B. Here, the height H of the rear surface 30Sb of the sensor 30a means the height of the back surface 30Sb of the sensor 30a when a fixing part 22SP of the inner surface 22SI, where the spring plate 41a is fixed, is taken as a base level. The height of the raised portion 30TP may preferably be 0.57 to 1.02 mm (both inclusive).

From the viewpoint of providing the sensing area 30Ra with an improved sensitivity, the sensing area 30Ra may preferably have the following features (a) to (c).
(a) The ratio (L/D) of the space L to the thickness D of the spring plate 41a is 18 to 60 (both inclusive), for example 30 (see FIG. 26B).
(b) The Young's module of the spring plate 41a is 4 to 5 GPa (both inclusive). As the spring plate 41a that satisfies such a Young's module, a PET film can be mentioned, for example.
(c) The ratio (L/H) of the space L to the height H of the rear surface 30Sb of the sensor 30a is 2.7 to 7.5 (both inclusive) (see FIG. 26B).

Owing to the possession of the above-described features (a) to (c) by the sensing area 30Ra, adequate tension is developed on the spring plate 41a in directions indicated by arrows T in FIG. 26B.

The embodiments of the present technology and their modifications have been specifically described above. However, the present technology shall not be limited to the above-described embodiments and modifications, and various modifications are possible based on the technical concept of the present technology.

For example, the configurations, methods, steps, shapes, materials, numerical values and the like mentioned in the above-described embodiments and their modifications are merely illustrative in every respect, and different configurations, methods, steps, shapes, materials, numerical values and the like may be used as needed.

Further, the configurations, methods, steps, shapes, materials, numerical values and the like in the above-described embodiments and their modifications can be combined one another unless departing from the spirit of the present technology.

Furthermore, the present technology can also adopt the following configurations.

(1)
An input device including:
a casing having a recess in an inner surface thereof; and
a pressure-sensitive sensor disposed in the recess,
wherein the pressure-sensitive sensor is fixed in the recess so that a sensing surface of the pressure-sensitive sensor and a bottom surface of the recess are in contact with each other.

(2)
The input device as described in (1), further including:
a pressing member configured to press the pressure-sensitive sensor against the bottom surface of the recess.

(3)
The input device as described in (2), wherein the pressure-sensitive sensor has a Young's modulus smaller than a Young's modulus of the pressing member.

(4)
The input device as described in (2) or (3), wherein the pressing member is fitted in the recess.

(5)
The input device as described in any one of (2) to (4), further including:
a fixing member configured to fix the pressing member.

(6)
The input device as described in any one of (1) to (5), wherein a raised portion is disposed on at least one of the sensing surface and the bottom surface of the recess.

(7)
The input device as described in any one of (1) to (6), wherein the casing has rigidity.

(8)
The input device as described in any one of (1) to (7), wherein the casing is made of a metal.

(9)
The input device as described in any one of (1) to (8), wherein the pressure-sensitive sensor includes
a conductive layer,
a sensor layer with a plurality of sensor portions included therein, and
a space layer disposed between the conductive layer and the sensor layer.

(10)
The input device as described in any one of (1) to (9), wherein the pressure-sensitive sensor and the recess are disposed along a peripheral edge of the casing.

(11)
The input device as described in any one of (1) to (9), wherein the casing has a rectangular surface, and the pressure-sensitive sensor and the recess are disposed along respective sides of the surface.

(12)
The input device as described in any one of (1) to (11), wherein the pressure-sensitive sensor has a sheet shape.

(13)
The input device as described in any one of (1) to (12), wherein the pressure-sensitive sensor has an elongated shape.

(14)

The input device as described in (13), wherein the pressure-sensitive sensor includes a plurality of sensor portions, and
the sensor portions are disposed in a longitudinal direction of the pressure-sensitive sensor.

(15)

An input device including:
a casing having a recess in an inner surface thereof; and
a plurality of elongated pressure-sensitive sensors disposed in the recess,
wherein the pressure-sensitive sensors are disposed at intervals in longitudinal directions of the pressure-sensitive sensors, and
the pressure-sensitive sensors are fixed in the recess so that sensing surfaces of the pressure-sensitive sensors are in contact with a bottom surface of the recess.

(16)

An input device including:
a casing having a plurality of recesses in an inner surface thereof, the recesses being disposed extending in a direction; and
a plurality of elongated pressure-sensitive sensors disposed in the recesses individually,
wherein the plural number of recesses are disposed in a like plural number of lines, and
the pressure-sensitive sensors are fixed in the recesses individually, so that sensing surfaces of the pressure-sensitive sensors are in contact with bottom surfaces of the recesses.

(17)

The input device as described in (16), wherein the arrays are disposed so that the recesses, which are adjacent one another in a direction orthogonal to the direction of the extending disposition, are shifted from one another in the direction of the extending disposition.

(18)

An input device including:
an exterior body having a recess in an inner surface thereof and having rigidity; and
a pressure-sensitive sensor disposed in the recess, wherein the pressure-sensitive sensor is fixed in the recess so that a sensing surface of the pressure-sensitive sensor and a bottom surface of the recess are in contact with each other.

(19)

An electrical apparatus including:
the input device described in any one of (1) to (18).

(20)

The electrical apparatus as described in (19), further including:
a control unit configured to control an operation of the electrical apparatus on the basis of detection results by the pressure-sensitive sensor.

(21)

The input device as described in (5), further including: an elastic layer disposed between the pressing member and the fixing member.

(22)

The input device as described in (1), wherein the pressure-sensitive sensor includes
a sensor layer with plural sensor portions included therein, and
a space layer disposed between the sensor layer and the bottom surface of the recess.

(23)

The input device as described in (22), wherein the bottom surface of the recess has conductivity.

(24)

The input device as described in (1), wherein a structure portion is disposed between the sensing surface and the bottom surface of the recess.

(25)

The input device as described in (24), wherein the structure portion is disposed at a middle of the sensing surface.

(26)

The input device as described in (25), wherein the structure portion is disposed at a middle and a peripheral edge of the sensing surface.

Still furthermore, the present technology can also adopt the following configurations.

(27)

An input device including:
a casing having a recess in an inner surface thereof; and
a pressure-sensitive sensor disposed in the recess,
wherein a sensing surface of the pressure-sensitive sensor and a bottom surface of the recess are bonded together.

(28)

The input device as described in (27), further including:
an adhesion layer disposed between the sensing surface of the pressure-sensitive sensor and the bottom surface of the recess.

(29)

A pressure-sensitive sensor including:
a conductive layer having a surface with a raised portion disposed therein;
an elongated sensor layer with plural sensor portions included therein; and
a space layer disposed between the conductive layer and the sensor layer,
wherein the plural sensor portions are disposed in a longitudinal direction of the sensor layer.

(30)

The pressure-sensitive sensor as described in (29), wherein the raised portion is disposed at a middle of the surface.

(31)

The pressure-sensitive sensor as described in (29), wherein the raised portion is disposed at a middle and a peripheral edge of the surface.

(32)

The pressure-sensitive sensor as described in any one of (29) to (31), which has a sheet shape.

(33)

The pressure-sensitive sensor as described in any one of (29) to (32), wherein the conductive layer has flexibility.

(34)

The pressure-sensitive sensor as described in any one of (29) to (33), wherein the sensor layer includes plural unit electrode portions forming a line, and one or more electrode traces disposed extending in a direction of the line so that the one or more electrode traces overlap the plural unit electrode portions in a thickness direction of the sensor layer.

(35)

The pressure-sensitive sensor as described in (34), wherein the electrode traces includes
a first electrode trace disposed extending from an end to substantially a middle of the line, and
a second electrode trace disposed extending from an opposite end to substantially the middle of the line, and the unit electrode bodies are disposed at positions symmetrical to each other with respect to the middle of the line, and are electrically connected to each other.

(36)

The pressure-sensitive sensor as described in (34), wherein the electrode traces are disposed adjacent each other, and are electrically connected to each other by a connection portion.

(37)

A pressure-sensitive sensor including:

an elongated sensor layer having a first surface and a second surface and including plural sensor portions;

a structure part disposed on and along a peripheral edge of the first surface of the sensor layer; and a conductive layer disposed on the second surface of the sensor layer, wherein the plural sensor portions are disposed in a longitudinal direction of the sensor layer.

REFERENCE SIGNS LIST

10 Electrical apparatus
10Sa Front surface
10Sb Back surface
11 Host processor
11PL Display device
11CM Camera module
12a, 12b Controller IC
13a, 13b, 13c, 13d PCBA
14a, 14b, 14c, 14d FPC
20 Casing
21 First casing
22 Second casing
23a, 23b, 23c, 23d Recess
24a, 24b, 24c, 24d Back plate
30Ra, 30Rb, 30Rc, 30Rd Sensing area
30a, 30b, 30c, 30d Sensor
30D Sensor portion
30TP Raised portion

The invention claimed is:

1. An input device comprising:

a casing having a recess in an inner surface thereof;

a pressure-sensitive sensor disposed in the recess, wherein the pressure-sensitive sensor is fixed in the recess so that a sensing surface of the pressure-sensitive sensor and a bottom surface of the recess are in contact with each other; and a pressing member configured to press the pressure-sensitive sensor against the bottom surface of the recess, wherein the pressure-sensitive sensor has a Young's modulus smaller than a Young's modulus of the pressing member.

2. The input device according to claim 1, wherein the pressing member is fitted in the recess.

3. The input device according to claim 1, further comprising: a fixing member configured to fix the pressing member.

4. The input device according to claim 1, wherein a raised portion is disposed on at least one of the sensing surface of the pressure-sensitive sensor and the bottom surface of the recess.

5. The input device according to claim 1, wherein the casing has rigidity.

6. The input device according to claim 1, wherein the casing is made of a metal.

7. The input device according to claim 1, wherein the pressure-sensitive sensor includes a conductive layer, a sensor layer with a plurality of sensor portions included therein, and a space layer disposed between the conductive layer and the sensor layer.

8. The input device according to claim 1, wherein the pressure-sensitive sensor and the recess are disposed along a peripheral edge of the casing.

9. The input device according to claim 1, wherein the casing has a rectangular surface, and the pressure-sensitive sensor and the recess are disposed along respective sides of the surface.

10. The input device according to claim 1, wherein the pressure-sensitive sensor has a sheet shape.

11. The input device according to claim 1, wherein the pressure-sensitive sensor has an elongated shape.

12. The input device according to claim 11, wherein the pressure-sensitive sensor includes a plurality of sensor portions, and the plurality of sensor portions are disposed in a longitudinal direction of the pressure-sensitive sensor.

13. An input device comprising:

an exterior body having a recess in an inner surface thereof and having rigidity;

a pressure-sensitive sensor disposed in the recess, wherein the pressure-sensitive sensor is fixed in the recess so that a sensing surface of the pressure-sensitive sensor and a bottom surface of the recess are in contact with each other; and a pressing member configured to press the pressure-sensitive sensor against the bottom surface of the recess, wherein the pressure-sensitive sensor has a Young's modulus smaller than a Young's modulus of the pressing member.

14. An electrical apparatus comprising:

a casing having a recess in an inner surface thereof;

a pressure-sensitive sensor disposed in the recess, wherein the pressure-sensitive sensor is fixed in the recess so that a sensing surface of the pressure-sensitive sensor and a bottom surface of the recess are in contact with each other; and a pressing member configured to press the pressure-sensitive sensor against the bottom surface of the recess, wherein the pressure-sensitive sensor has a Young's modulus smaller than a Young's modulus of the pressing member.

15. The electrical apparatus according to claim 14, further comprising:

a control unit configured to control an operation of the electrical apparatus on the basis of detection results by the pressure-sensitive sensor.

* * * * *